(12) United States Patent
Ke

(10) Patent No.: US 12,465,142 B2
(45) Date of Patent: Nov. 11, 2025

(54) FOLDABLE CARRYING EQUIPMENT

(71) Applicant: CHAO YUON CO., LTD, Changhua County (TW)

(72) Inventor: Chia-Liang Ke, Changhua County (TW)

(73) Assignee: CHAO YUON CO., LTD, Changhua County (TW)

( * ) Notice: Subject to any disclaimer, the term of this patent is extended or adjusted under 35 U.S.C. 154(b) by 0 days.

(21) Appl. No.: 18/965,254

(22) Filed: Dec. 2, 2024

(65) Prior Publication Data
US 2025/0176709 A1 Jun. 5, 2025

(30) Foreign Application Priority Data
Dec. 5, 2023 (TW) .................................. 112147333

(51) Int. Cl.
*A47B 43/00* (2006.01)
*B62B 3/02* (2006.01)

(52) U.S. Cl.
CPC ................ *A47B 43/00* (2013.01); *B62B 3/02* (2013.01)

(58) Field of Classification Search
CPC ......... A47B 43/00; A47B 46/005; B62B 3/02; B62B 3/002
See application file for complete search history.

(56) References Cited

U.S. PATENT DOCUMENTS

| 1,198,431 | A | * | 9/1916 | Forsyth | A47F 5/13 |
| | | | | | 211/38 |
| 3,093,247 | A | * | 6/1963 | Erickson | A47B 43/00 |
| | | | | | 211/149 |
| 4,740,010 | A | * | 4/1988 | Moskovitz | A47B 31/04 |
| | | | | | 108/177 |
| 5,806,864 | A | * | 9/1998 | Zielinski | B62B 3/02 |
| | | | | | 280/42 |
| 8,256,630 | B2 | * | 9/2012 | Zhu | A47B 31/04 |
| | | | | | 211/195 |
| 8,672,147 | B2 | * | 3/2014 | Lam | A47F 7/18 |
| | | | | | 211/85.3 |
| 9,226,574 | B1 | * | 1/2016 | Chen | A47B 96/07 |
| 9,474,368 | B2 | * | 10/2016 | Frankel | A47B 43/00 |

(Continued)

FOREIGN PATENT DOCUMENTS

TW   M546936 U   8/2017
TW   M556218 U   3/2018

*Primary Examiner* — Stanton L Krycinski
(74) *Attorney, Agent, or Firm* — LANWAY IPR SERVICES; Chun-Ming Shih

(57) ABSTRACT

A kind of foldable carrying equipment is provided. The carrying equipment includes four legs, at least two platforms each of which having two adjacent loading plates and pivot plates, a support linkage rod set having a support rod pivotally connected to inner sides of the loading plates and operable for driving the loading plates to switch between folded and extended positions, an outer stopper arranged at outer sides of the loading plates or between the legs for supporting the outer sides, and a first inner stopper. The outer side of the loading plate is pivotally connected to the legs and one side of the inner side is pivotally connected to the pivot plate. The first inner stopper is disposed on the inner side of the loading plate and between the pivot plate and a pivot piece of the support rod for supporting the inner side of the loading plate.

10 Claims, 19 Drawing Sheets

(56) References Cited

U.S. PATENT DOCUMENTS

| | | | |
|---|---|---|---|
| 9,545,137 B2* | 1/2017 | Frankel | A45C 7/0036 |
| 9,896,118 B2* | 2/2018 | Choi | B62B 3/007 |
| 9,913,533 B1 | 3/2018 | Ke | |
| 10,292,491 B1 | 5/2019 | Ke | |
| 10,602,838 B2* | 3/2020 | Ou | A47B 9/20 |
| 10,604,170 B1 | 3/2020 | Davis | |
| 11,116,313 B2* | 9/2021 | Leung | A47F 5/10 |
| 11,155,289 B2* | 10/2021 | You | B62B 3/02 |
| 11,172,759 B2* | 11/2021 | Liu | A47B 47/028 |
| 11,208,132 B2* | 12/2021 | Chen | B62B 3/025 |
| 11,246,408 B2* | 2/2022 | Jiang | A47B 43/00 |
| 11,478,075 B2* | 10/2022 | Doherty | A47B 43/00 |
| 11,523,686 B1* | 12/2022 | Liu | A47B 96/06 |
| 11,767,045 B2* | 9/2023 | Zesch | B62B 3/025 280/651 |
| 11,981,364 B2* | 5/2024 | Ma | B62B 5/0461 |
| 12,089,735 B2* | 9/2024 | Hanlon | A47B 43/00 |
| 2004/0226491 A1* | 11/2004 | Chen | A47B 43/00 108/124 |
| 2007/0251907 A1* | 11/2007 | Li | A47B 3/087 211/195 |
| 2011/0155680 A1* | 6/2011 | Pong | A47B 43/00 211/199 |
| 2011/0253660 A1* | 10/2011 | Pong | A47B 43/00 211/198 |

* cited by examiner

FOLDABLE CARRYING EQUIPMENT

FIELD OF THE INVENTION

The present invention relates to a kind of equipment used for carrying objects, especially to a kind of foldable carrying equipment.

BACKGROUND OF THE INVENTION

No matter fixed racks or moveable trolleys, they are used to carry various object. Especially the movable trolley, it's convenient for transportation of object. A typical application of the trolley is used for shopping and carrying goods. Then move the trolley to a parking lot and place the goods into cars. The trolley can also be applied to different workplaces, even at home environments.

In order to have sufficient capacity, a volume of these racks or trolleys is not small and this a certain space is occupied. This affects space utilization and the large volume is not convenient for placement or storage while not in use. Thus there are quite a lot foldable racks or trolleys available on the market now and related patent documents are provided. For example, analogues of the foldable rack or trolley are provided in Taiwanese Pat. No. M546936U (Utility model), Taiwanese Pat. No. M556218U (Utility model), U.S. Pat. No. 10,292,491B1 (invention), U.S. Pat. No. 10,604,170B1, etc.

The foldable rack or trolley mentioned in the above patents includes a plurality of legs and at least two platforms disposed among the legs. Each of the platforms consists of two loading plates arranged adjacent to each other and able to be folded and extended. In order to allow these loading plates to be extended and folded freely and stably, there are many kinds of pivot structures able to be pivotally rotates and a plurality of support linkage rod set able to be operated by users. In a common design, each of two sides of the loading plates of the platform adjacent to each other is provided with a support linkage rod set. The typical support linkage rod set includes a support rod, two linkage rods, and a slider. The support rod is disposed between inner sides of the vertically-arranged loading plates of the platform close to each other. The linkage rod is disposed in a V-shape and its top end is pivotally connected to the corresponding loading plate. The slider is able to slide along the support rod. Preferably, the slider is able to be loosened or fastened. For example, the slider is loosened from or fastened on a specific position of the support rod by an elastic press portion or a pull-lock fastener disposed on the slider. A bottom of the linkage rod is pivotally connected to two sides of the slider. Thereby users can pull or push the top end of one of the support rods to force the slider sliding vertically along the support rod. At the same time, the linkage rod is further moved and the loading plates of the platform are pivotally rotated along with the slider. Thereby the rack or trolley are folded and expanded. It can be understood that the support linkage rod set is mainly used for equally-distributed forces and synchronous operation. That means not matter objects or goods are placed on the upper platform, the lower platform, or both platforms, weight of the objects or the goods is distributed to the respective platforms through the design of the support linkage rod set to share all the forces equally. Moreover, synchronous movement of the loading plates of the upper platform and the lower platform, or the adjacent loading plates of the same platform is ensured during the folding process or expansion process.

It is easy to understand that two adjacent sides of the two adjacent loading plates of the platform are both provided with one support linkage rod set to ensure stable support for the respective platforms. However, such design has apparent shortcomings, especially under certain conditions. For example, users need to place object with larger volume to the lower platform through the side. Inevitably, the support linkage rod set arranged at a middle part of the respective sides causes a bump in the road during placement of the larger objects. In order to solve the above problem, a feasible solution is to omit one of the support linkage rod sets arranged at one side and only one support linkage rod set is used. However, a problem of insufficient support strength for the respective platforms is also derived. Once the objects are heavier, the respective loading plates may collapse at the sides adjacent to each other. Although various types of stopping structure between the adjacent loading plates are designed and provided in some patent documents, they are usually used for limiting and unable to provide sufficient and effective support, especially when placed with heavy objects.

Furthermore, even the design of double support linkage rod sets is used, only the forces applied are equally distributed to the respective platform and no stable and effective support is provided. In order to solve the problem, a caster is disposed under the respective support linkage rod sets in U.S. Pat. No. 10,604,170B1 to increase support strength of a middle portion of the respective platforms. However, the design of the caster also has its own disadvantage. For example, the caster is easy to suspend and lose its support function when the ground is uneven. Or the caster makes other legs hang in the air so that smoothness or stability of the movement is affected. In other words, the function and operation of the caster are often severely compromised while in use.

A foldable trolley is provided in Japanese Pat. Pub. No. 2023-7258 A and at least one stopping block is disposed on an outer side of the respective loading plates or respective legs correspondingly. When the respective loading plates are extended to be set horizontally, the loading plate is limited and maintained at a horizontal position, by the stopping block on the outer side of the loading plate abutting against the corresponding leg or the stopping block on the leg abutting against the outer side of the loading plate, without being pivotally rotated in the valley folding direction. However, we all learn that a middle portion of the respective platform (the sides of right and left loading plates close to each other) is the most stressed area and the easiest place to have collapse and deformation when objects are loaded on the loading plates of the platform. The above design which prevents the loading plate from rotating in the valley folding direction is obviously insufficient to prevent the deformation of the platform because a larger width of the respective loading plates is not taken into consideration sufficiently. Once the objects loaded are heavier, the platform is still deformed easily. Thereby support provided by the sides of the loading plates close to each other needs to be reinforced for preventing the right and left loading plates from collapsing.

SUMMARY

Therefore, it is a primary object of the present invention to provide a foldable carrying equipment which includes four legs, at least two platforms, a support linkage rod set, an outer stopper, and a first inner stopper. The platforms are vertically arranged and each of the platforms having two adjacent loading plates and a plurality of pivot plates. An outer side of the loading plate is pivotally connected to the legs and one side of an inner side is pivotally connected to the pivot plate. The support linkage rod set is provided with a support rod vertically disposed and pivotally connected to the other end of the inner sides of the loading plates and operable for driving the loading plates to switch between a folded position and an extended position. The outer stopper is arranged at the outer sides of the loading plates or between the legs for supporting the outer side of the loading plate while the loading plate is at the extended position. The first inner stopper is disposed on the inner side of the loading plate and located between the pivot plate and a pivot piece of the support rod for supporting the inner side of the loading plate while the loading plate is at the extended position.

The foldable carrying equipment according to the present invention allows both the inner side and the outer side of the respective loading plates to be stopped and limited by the outer stopper and the first inner stopper while the loading plates of the platform are pivotally rotated from the folded position to the extended position simultaneously. Thereby support of the loading plate is further improved, especially an intermediate portion of the loading plate. Therefore, the loading plate can be maintained at a horizontal state quite well while being at the extended position, without being collapsed and deformed toward valley-folding direction due to heavy objects loaded on the loading plates.

DETAILED DESCRIPTION

Figure 1:
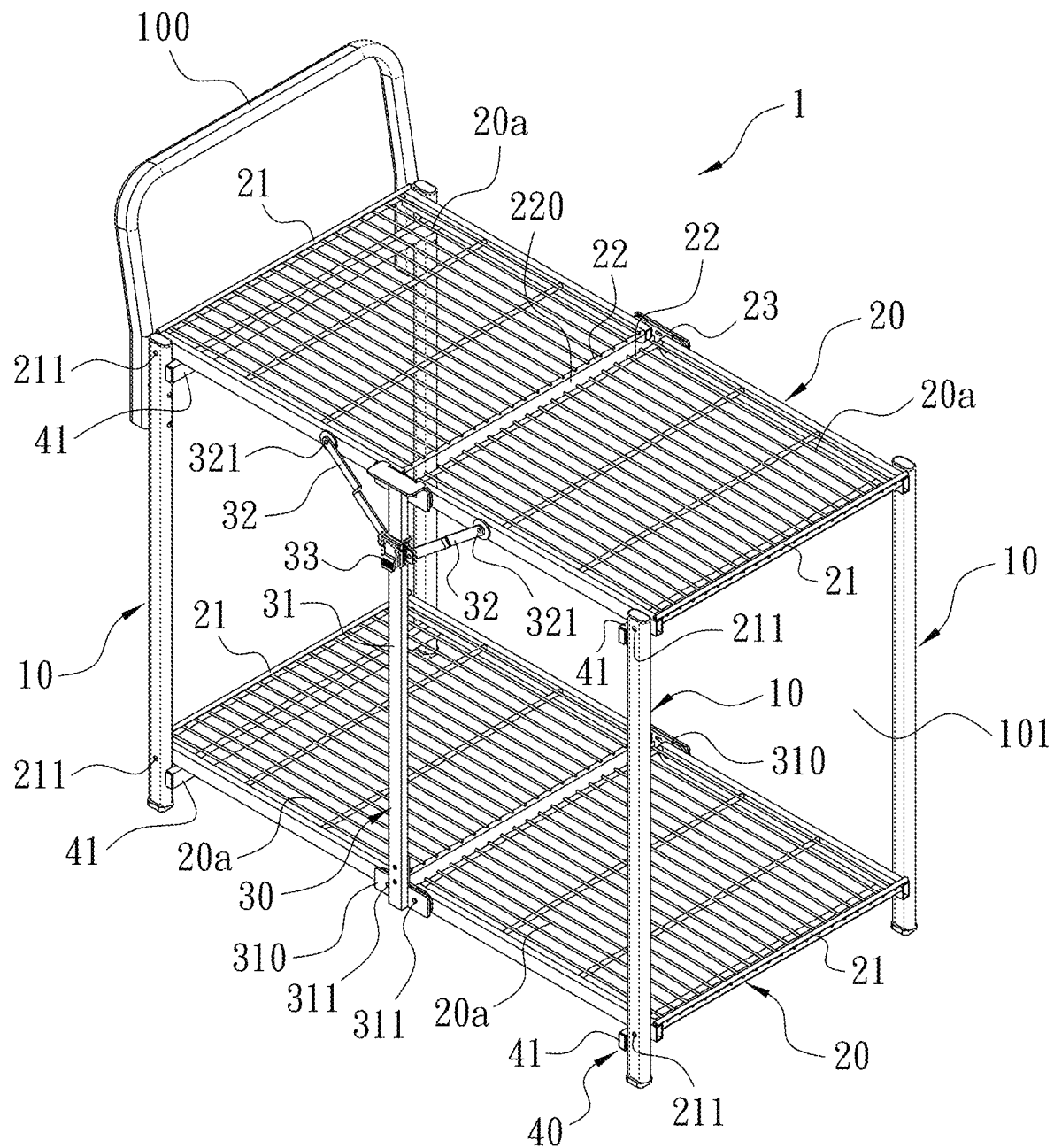
FIG. 1 is a perspective view of an embodiment of a carrying equipment in an extended state according to the present invention.

Refer to FIGS. 1-4 and FIG. 8, a first embodiment of a foldable carrying equipment is provided. In this embodiment, a foldable carrying equipment 1 is designed into a shelf, but not limited. The carrying equipment 1 can also be a trolley or in other forms.

The carrying equipment 1 includes four legs 10, at least two platforms 20, a support linkage rod set 30, an outer stopper 40, and a first inner stopper 50.

The four legs 10 are respectively arranged at four corners correspondingly.

Figure 2:
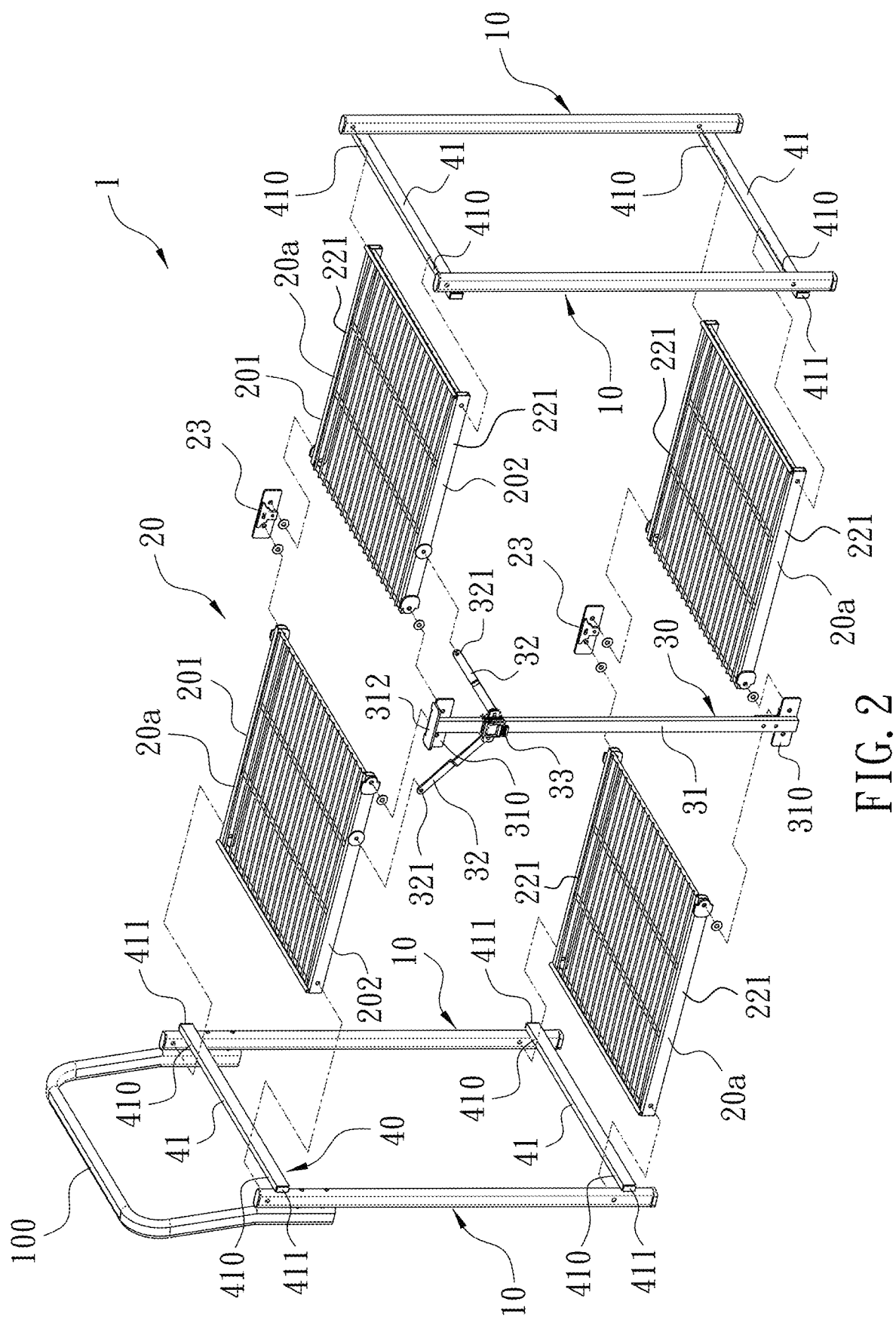
FIG. 2 is an exploded view of the embodiment in FIG. 1 according to the present invention.
Figure 3:
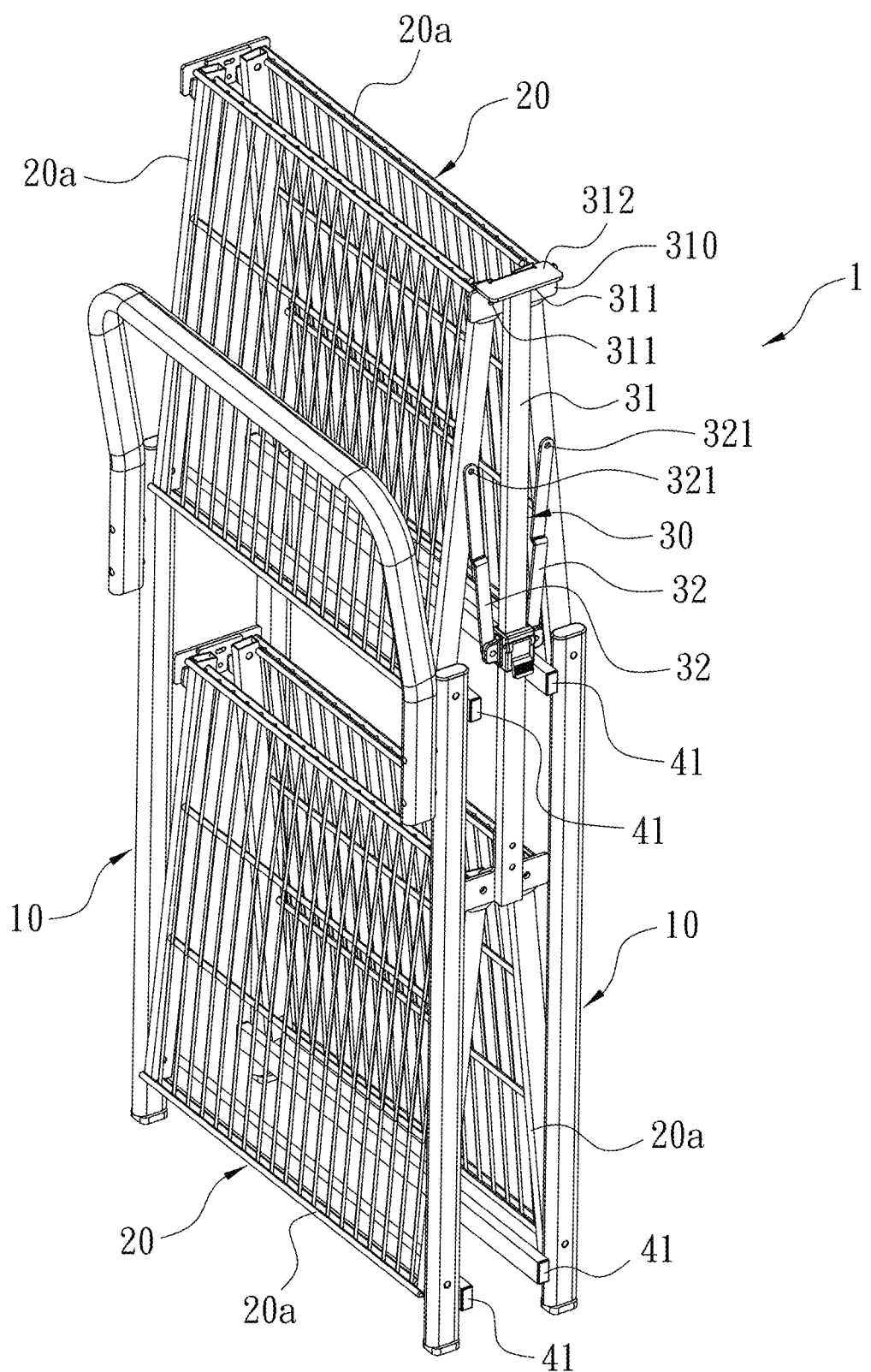
FIG. 3 is another perspective view of an embodiment of a carrying equipment in a folded state according to the present invention.
Figure 4:
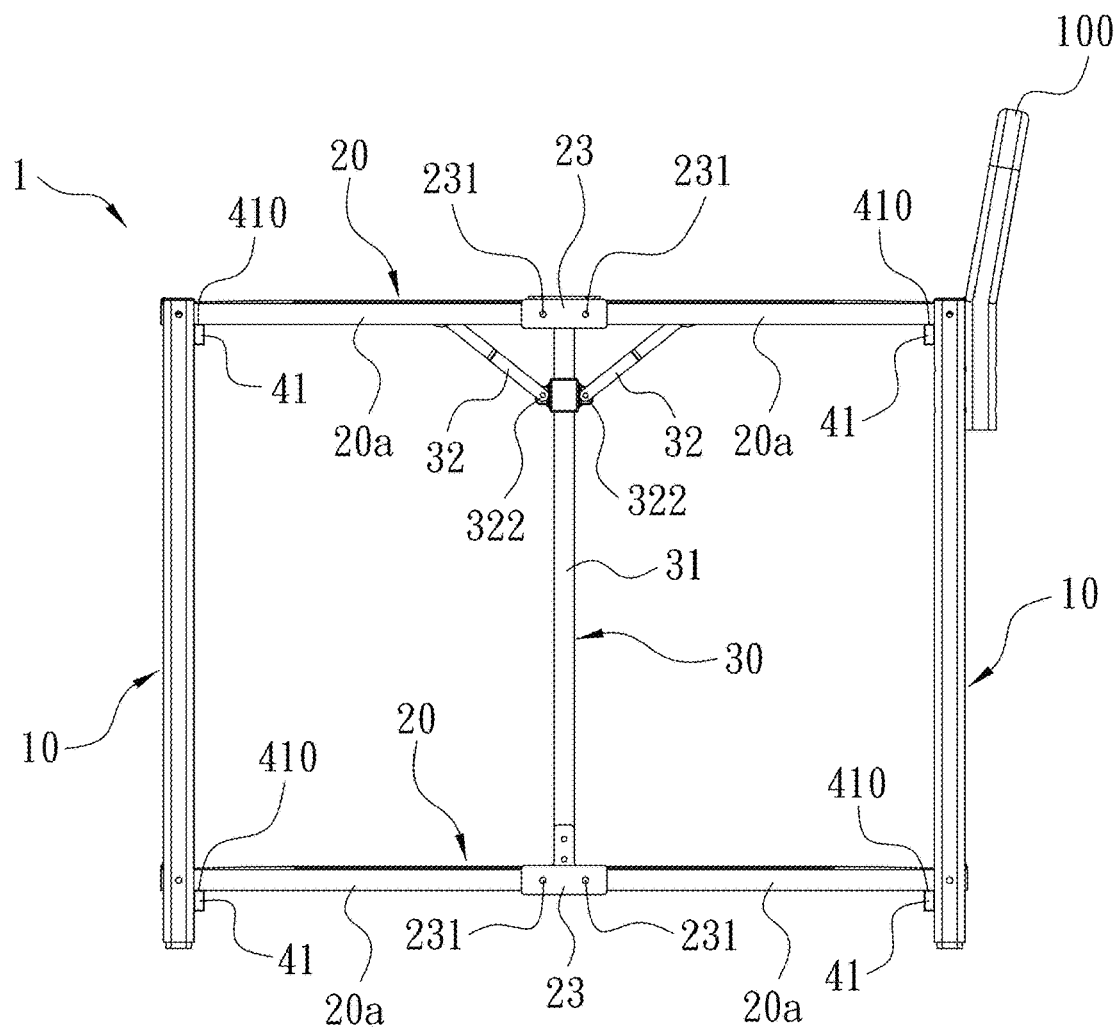
FIG. 4 is a left view of the embodiment in FIG. 1 according to the present invention.
Figure 7:
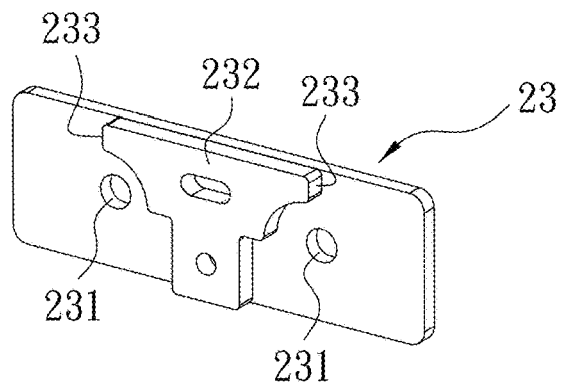
FIG. 7 is a perspective view showing an inner side of a pivot plate in an embodiment according to the present invention.
Figure 8:
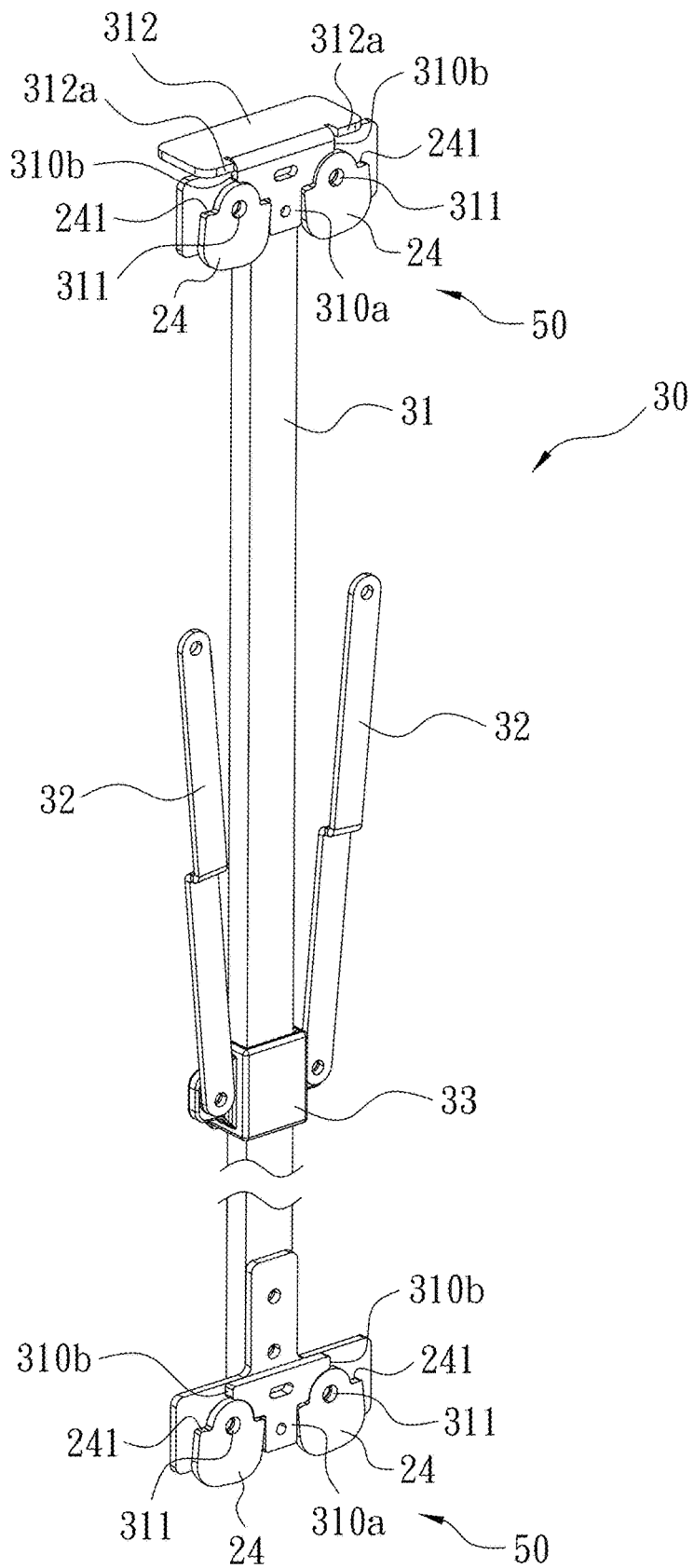
FIG. 8 is a perspective view showing an inner side of a support linkage rod set in a folded state used in combination with limit blocks of an embodiment according to the present invention.

The two platforms 20 are disposed vertically. As shown in FIG. 1, there are two platforms 20 at an upper position and a lower position in this embodiment, but not limited. The number of the platforms 20 can also be more than two. The platform 20 consists of two loading plates 20a arranged adjacent to each other. Each of the loading plates 20a includes an outer side 21, an inner side 22, a first side 201, and a second side 202. In the two adjacent loading plates 20a, the outer sides 21 are away from each other and the inner sides 22 are close to each other while the two first sides 201 and the two second sides 202 are opposite to each other. Two ends of the outer side 21 of the loading plate 20a are pivotally connected to the legs 10 to form outer pivot points 211 correspondingly. The platform 20 further includes a plurality of pivot plates 23, as shown in FIG. 2 and FIG. 7. A junction between the inner side 22 and the first side 201 of the loading plate 20a is pivotally connected to the pivot plate 23 to form a first pivot point 231 and there is a gap 220 formed between the two inner sides 22. Thus the inner sides 22 of the loading plate 20a can be either moved upward and pivotally rotated to a folded position, as shown in FIG. 3, or moved downward and pivotally rotated to an extended position, as shown in FIG. 1. The folded and the extended positions are about the same as those of prior arts and not described in detail herein.

Figure 6:
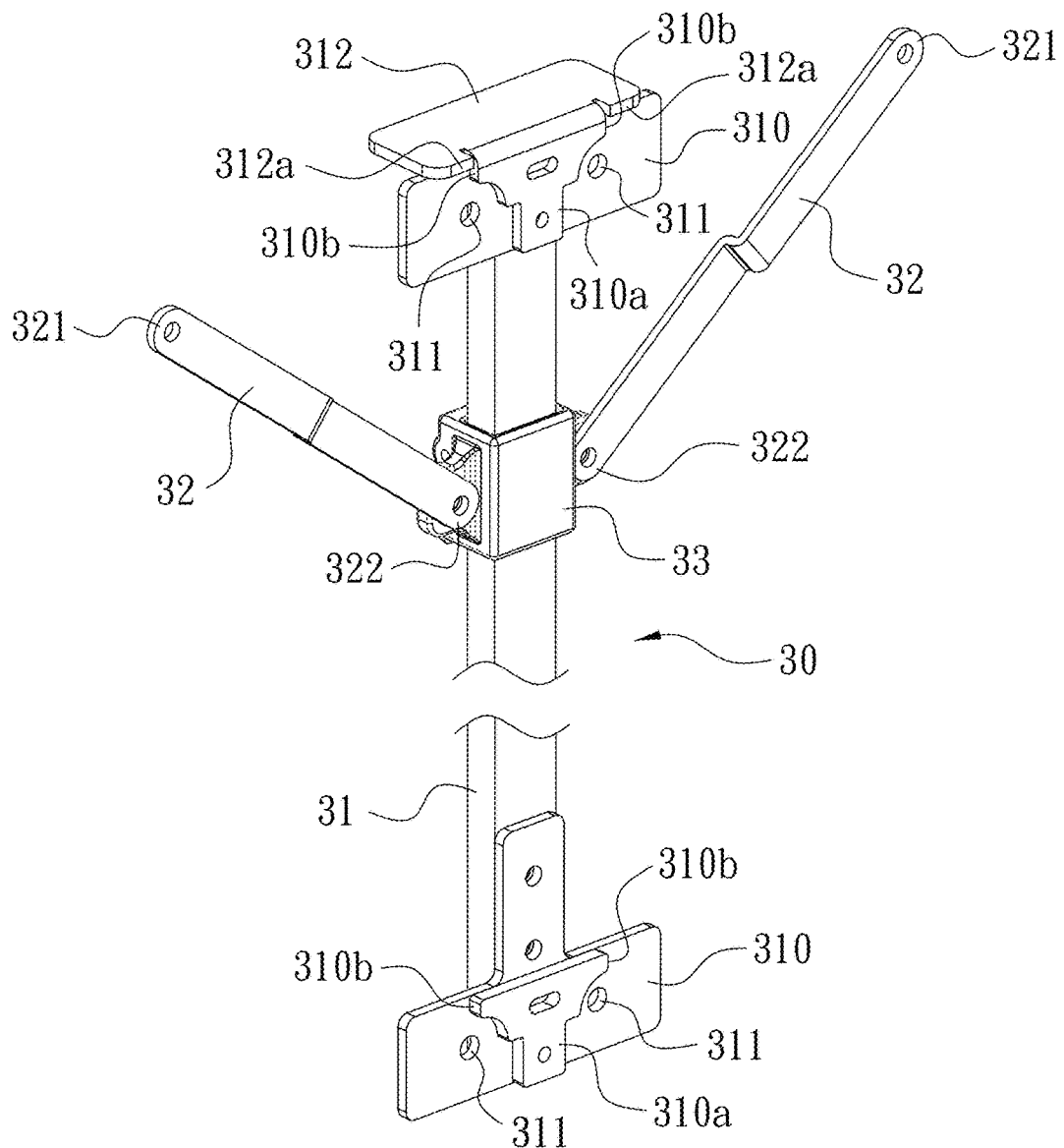
FIG. 6 is a perspective view showing an inner side of a support linkage rod set in an embodiment according to the present invention.

The support linkage rod set 30 can be selectively disposed on either the first side 201 or the second side 202 of the loading plate 20a. In this embodiment, the support linkage rod set 30 is disposed on the second side 202. As shown in FIG. 6, the support linkage rod set 30 consists of a support rod 31, two linkage rods 32, and a slider 33. The support rod 31 is vertically arranged and pivotally connected to the inner sides 22 of the loading plates 20a of the platform 20 which are close to each other. The two linkage rods 32 are disposed in a V-shape and each of the linkage rods 32 is provided with a first end portion 321 and a second end portion 322. The first end portion 321 is pivotally connected to a position between the outer side 21 and the inner side 22 of the loading plate 20a of the platform 20. The slider 33 is slidably moved along the support rod 31 and operable to be loosened from or fastened on the support rod 31. The second end portion 322 of the linkage rod 32 is pivotally connected to and positioned on the slider 33 so that linkage rod 32 is pivotally rotated along with vertical movement of the support rod 31. For example, the slider 33 is forced to slide along the support rod 31 when users apply a force to pull up or press down a top end of the support rod 31. Thereby the respective loading plates 20a of the platform 20 are driven to be pivotally rotated and switched between the folded position and the extended position.

Moreover, as shown in FIG. 6, the support rod 31 is provided with at least two pivot pieces 310 each of which is provided with two second pivot points 311. The pivot pieces 310 are disposed on positions at the same levels as the respective platforms 20 correspondingly. A junction between the inner side 22 and the second side 202 of the loading plate 20a is pivotally connected to the corresponding pivot piece 310 to form the second pivot point 311, as shown in FIG. 1. The two second pivot points 311 are spaced apart due to the gap 220 between the two inner sides 22. Thereby the junction between the inner side 22 and the first side 201 of the loading plate 20a and the junction between the inner side 22 and the second side 202 of the loading plate 20a can be respectively rotated pivotally around the first pivot point 231 and the second pivot point 311, and thus switched between the folded position and the extended position synchronously.

A mechanism for loosening and fastening of the slider 33 and structure for movement among the slider 33, the linkage rods 32, and the support rod 31 are prior arts and thus not described in detail herein.

In this embodiment, a single support linkage rod set 30 is taken as an example. The support linkage rod set 30 is vertically arranged and disposed on the sides adjacent to the inner sides 22 of the respective loading plates 20a of the platform 20 such as the second side 202 in this embodiment. In order to allow the user to move the carrying equipment 1 which is designed into a shelf conveniently, top ends of the two adjacent legs 10 at the same side are provided with a handle 100 able to be held by the user. It should be understood that the user usually stands close to one side of the handle 100. In the following description, the side close to the handle 100 is defined as a back side while the side away from the handle 100 is defined as a front side. As shown in FIG. 1, it is clear that the support linkage rod set 30 is disposed on the right side. Thus a full, non-obstructed larger opening 101 is formed on the left side and used for allowing objects with larger volume to be placed onto the platform 20 at the lower position.

The outer stopper 40 includes a plurality of stopping members arranged at the outer sides 21 of the respective loading plates 20a of the platform 20 away from each other or the corresponding legs 10. When the loading plates 20a are rotated downward to the extended position, the two adjacent loading plates 20a are stopped and limited by the stopping members, without being rotated toward a valley-folding direction. Thus the outer sides 21 of the respective loading plates 20a are further supported.

In this embodiment, the stopping member is a horizontal support rod 41 having two end portions 411 fixed on an inner side of the two legs 10 adjacent to each other and located at the same side such as the front side or the back side. The end portion 411 of the horizontal support rod 41 is provided with a stopping portion 410. It should be understood that the stopping portion 410 is located at the inner side of the outer pivot point 211, as shown in FIG. 1 and FIG. 2. A side frame 221 is located at both the first side 201 and the second side 202 of the loading plate 20a. Thus the outer side 21 of the respective loading plates 20a gets good support and reinforcement due to a corresponding portion of the side frame 221 abutting against and stopped by the stopping portion 410 when the respective loading plates 20a of the platform 20 are pivotally rotated to the extended position. At the same time, rotation toward the valley-folding direction is also prevented. The design with the single support linkage rod set 30 especially has higher requirement for support and reinforcement.

In this embodiment, a plurality of connection rods is arranged between and fixed on the two adjacent legs 10 at the same side. The connection rod can be used to form the horizontal support rod 41. In other words, arrangement of the connection rods is to connect the two adjacent legs 10 at the same side with each other for increasing connection strength and structural firmness. In order to simplify the structure, the horizontal support rod 41 can also use as the connection rods and provide the same function. Thus there is no need to arrange the connection rods, but not limited. In other embodiments, additional connection rods can also be provided.

As shown in FIGS. 5-8, the first inner stopper 50 consists of a plurality of first limit bumps 232, a plurality of second limit bumps 310a, and a plurality of limit blocks 24.

Figure 5:
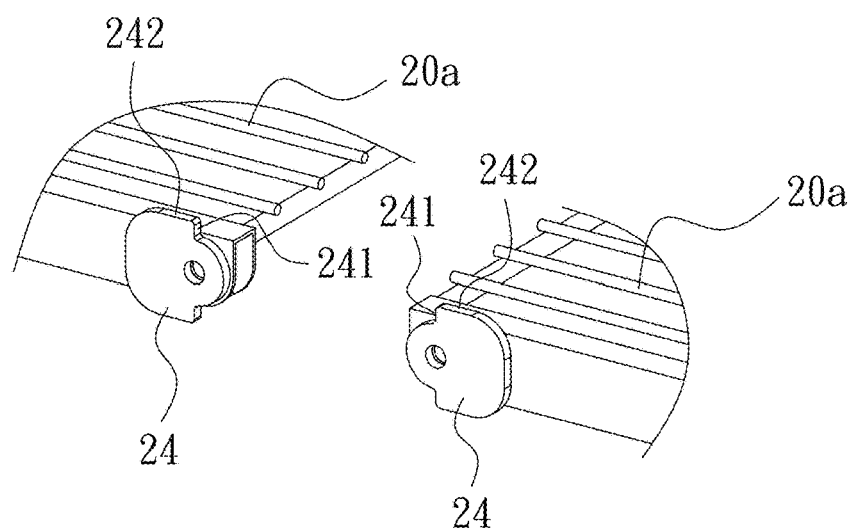
FIG. 5 is a partial perspective view showing an area of two loading plates adjacent to each other of a platform in an embodiment according to the present invention.

The first limit bump 232 is projecting from an area around the first pivot point 231 on an inner side of the pivot plate 23. Each of the first limit bumps 232 is provided with a first limit wall 233 formed on each of two sides of the first limit bump 232. Similarly, the second limit bump 310a is projecting from an area around the second pivot point 311 on an inner side of the pivot piece 310. Each of the second limit bumps 310a is provided with a second limit wall 310b formed on each of two sides of the second limit bump 310a. The limit blocks 24 are disposed on the first pivot point 231 and the second pivot point 311 of the loading plate 20a. As shown in FIG. 5, each of the limit blocks 24 is provided with a limit lock wall 241. When the loading plate 20a is pivotally rotated from the folded position to the extended position, the support effect of the inner side 22 of the loading plate 20a of the platform 20 is strengthened due to the limit lock walls 241 abutting against and stopped by the first limit wall 233 of the pivot plate 23 and by the second limit wall 310b of the pivot piece 310 correspondingly, as shown in FIG. 5 and FIGS. 8-10. In other words, support of the respective loading plates 20a of the platform 20, no matter the outer side 21 or the inner side 22, can be respectively improved by the structural design of the outer stopper 40 and the first inner stopper 50. Thus it is ensured that the loading plate 20a can be maintained at a horizontal state quite well while being extended, especially being mounted with heavy objects. The above design can prevent the inner sides 22 of the loading plates 20a from collapsing and deforming in the valley-folding direction and the objects are placed and loaded on the loading plates 20a well.

Figure 9:
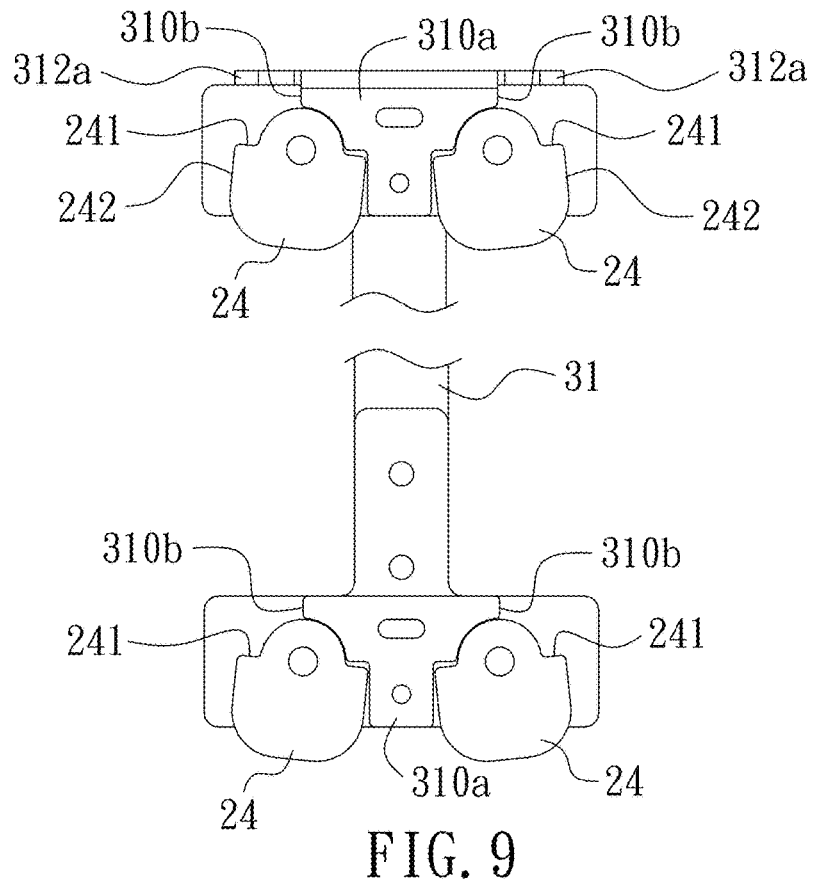
FIG. 9 is a partial planar view showing an inner side of a support linkage rod set of the embodiment in FIG. 8 according to the present invention.
Figure 10:
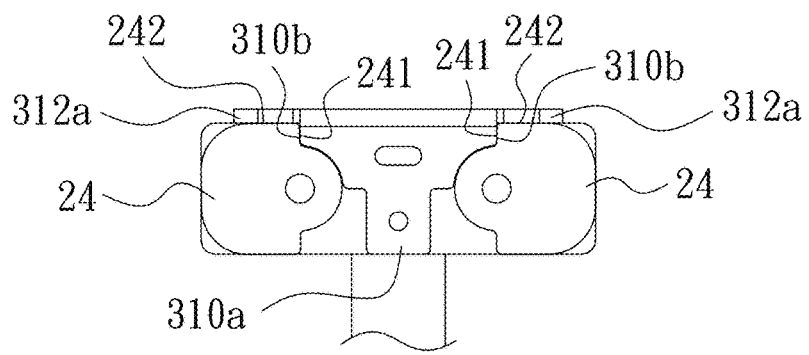
FIG. 10 is a partial planar view showing an inner side of a support linkage rod set in an extended state of an embodiment according to the present invention.

In this embodiment, a braking plate 312 is disposed on the top end of the support rod 31 so that users can apply forces vertically for operation of the support rod 31 and further movement of the loading plates 20a of the respective platforms 20 along with the support rod 31. In a preferred embodiment, a lug 312a is horizontally protruding from of the inner side of the pivot piece 310 of the support rod 31 at the same level of the upmost platform 20 and located over the second pivot point 311, as shown in FIG. 6. Refer to FIG. 5, a stopping edge 242 is arranged adjacent to the limit lock wall 241 of the limit block 24 corresponding to the lug 312a. When the loading plate 20a is pivotally rotated from the folded position to the extended position, the stopping edge 242 is abutting against and limited by the corresponding lug 312a of the pivot piece 310, as shown in FIG. 9 and FIG. 10. Thereby the support strength and stability of the second side 202 of the respective loading plates 20a of the platform 20 at the upper position are improved while being extended.

In order to simplify the structure, the lug 312a can be directly extended from an inner side of the braking plate 312 and integrated with the braking plate 312. It should be understood that the first inner stopper 50 can further include the lug 312a and the corresponding stopping edge 242.

Figure 11:
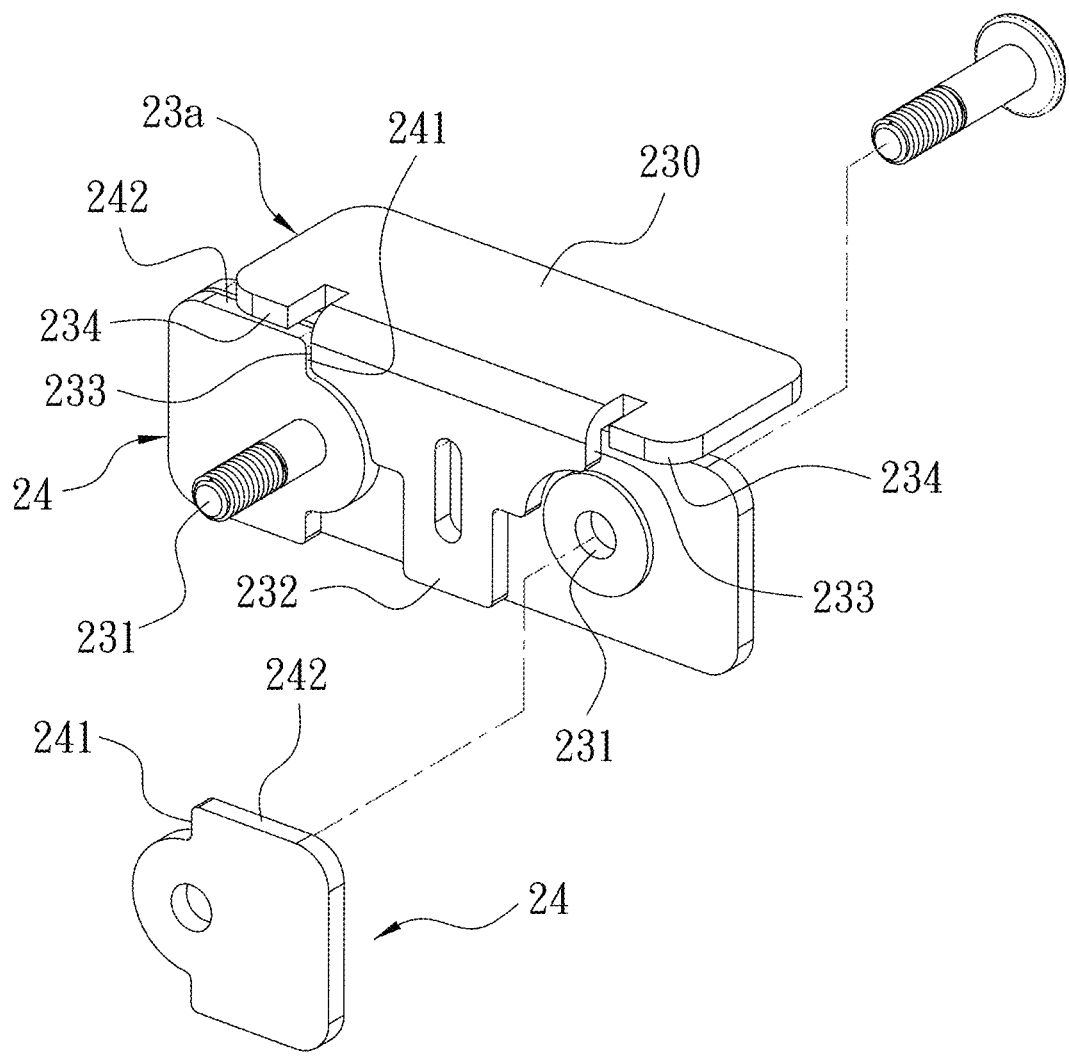
FIG. 11 is a perspective view showing a pivot plate of the upmost platform in another form and an exploded view of a corresponding limit block of an embodiment according to the present invention.
Figure 12:
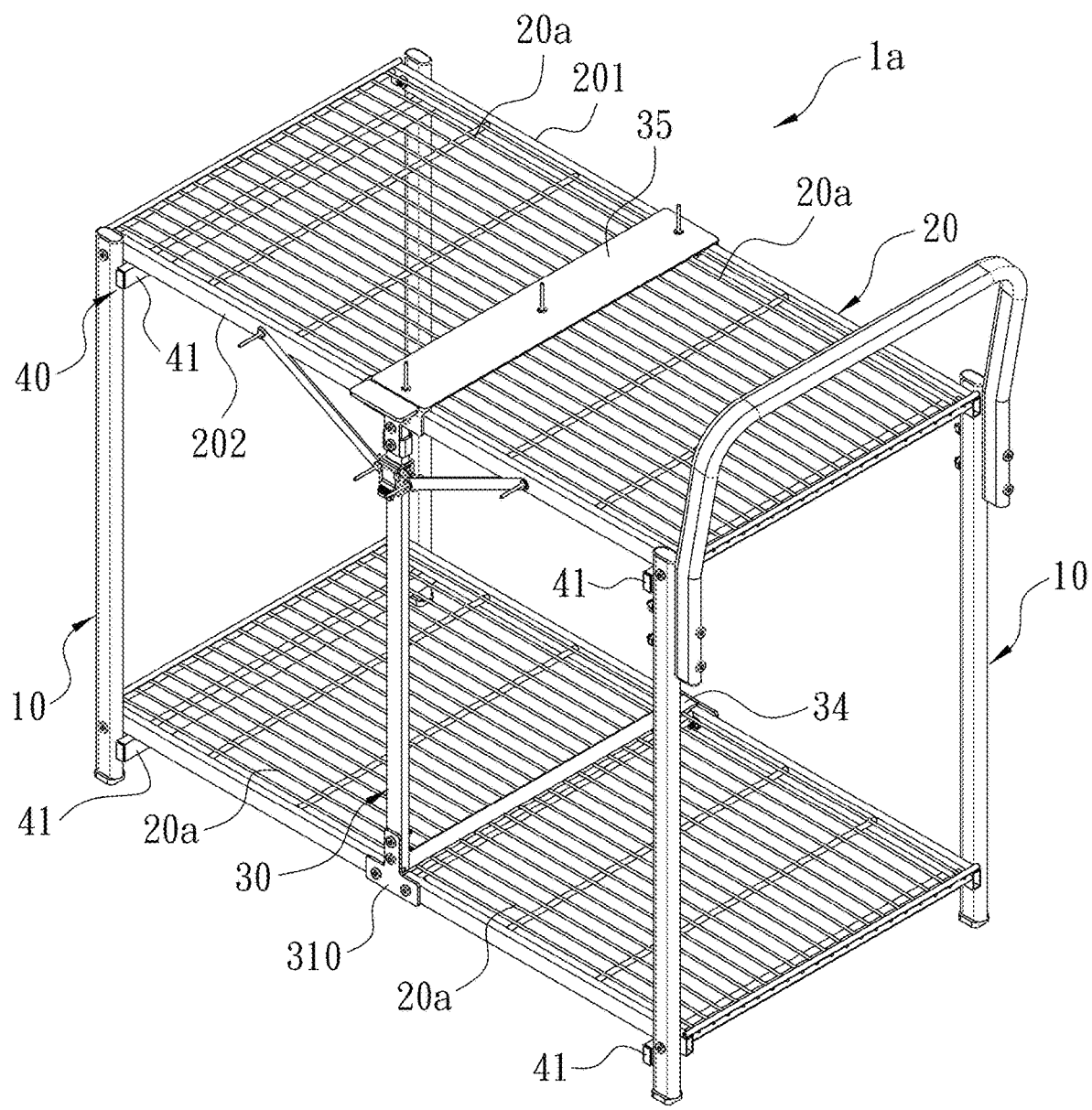
FIG. 12 is a perspective view of a second embodiment of a carrying equipment in an extended state according to the present invention.
Figure 13:
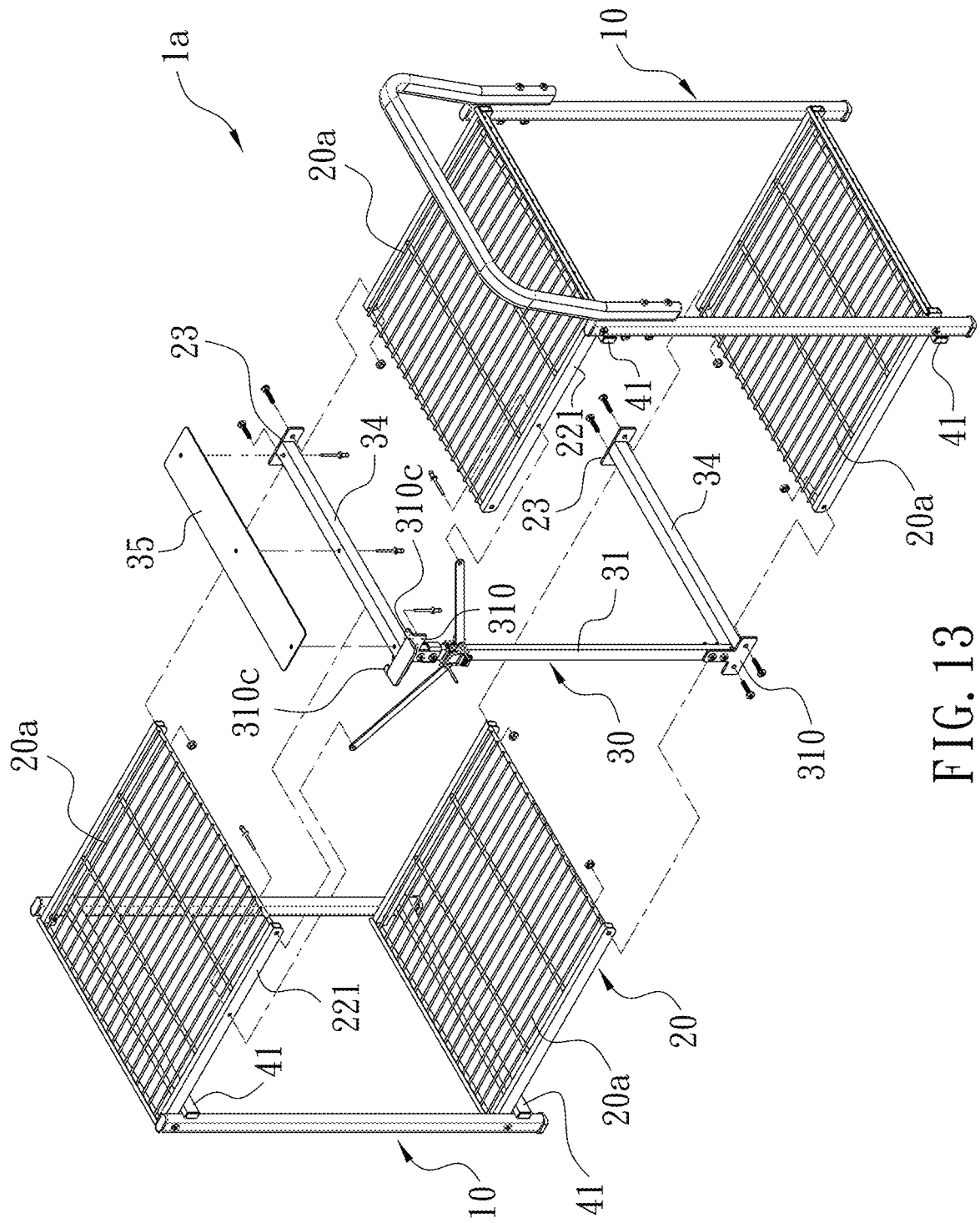
FIG. 13 is an exploded view of the embodiment in FIG. 12 according to the present invention.
Figure 14:
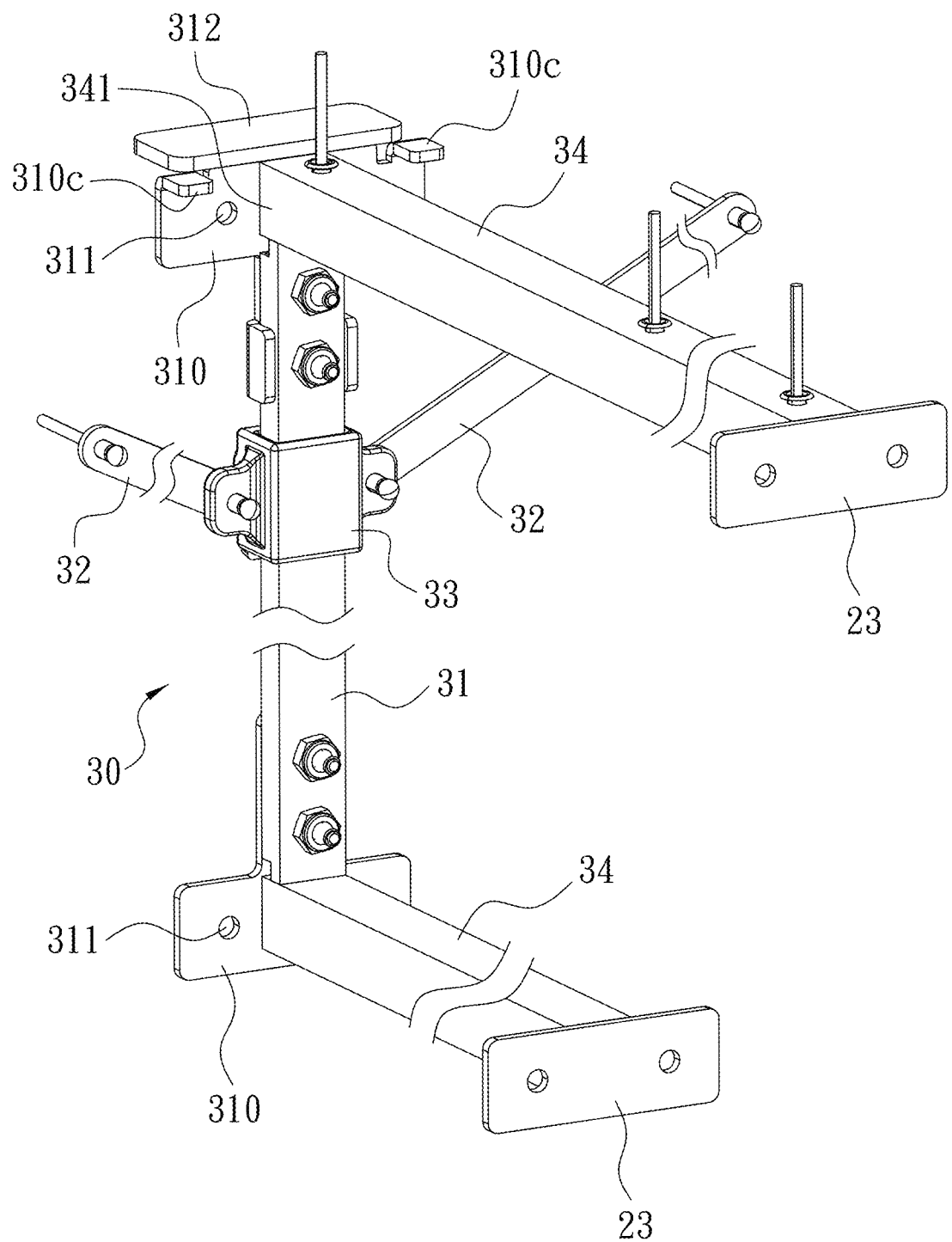
FIG. 14 is a partial perspective view showing a support linkage rod set, a bar, and pivot plates assembled with one another of a second embodiment in an extended state according to the present invention.

Similarly, the pivot plate 23 of the upmost platform 20 of the first embodiment can also be modified into a pivot plate 23a in another form. As shown in FIG. 11, the difference between this form and the above one is in that a lug 234 is projecting horizontally from an inner side of the pivot plate 23a and located above the first pivot point 231. When the loading plate 20a is pivotally rotated from the folded position to the extended position, the stopping edge 242 of the limit block 24 is abutting against and limited by the lug 234 of the corresponding pivot plate 23a, as shown in FIG. 9 and FIG. 10. Thereby the support strength and stability of the first side 201 of the respective loading plates 20a of the platform 20 at the upper position are improved while being extended.

In a preferred embodiment, a detent plate 230 is arranged at a top end of the pivot plate 23a so that users can use their hands to pull up or press down the detent plate 230 at the first side 201 and the braking plate 312 at the second side 202 at the same time for folding or extending the respective loading plates 20a of the platform 20. In order to simplify the structure, the lug 234 can be directly extended from an inner side of the detent plate 230 and integrated with the detent plate 230. It should be understood that the first inner stopper 50 can further include the lug 234 and the corresponding stopping edge 242.

As shown in FIGS. 12-16, a second embodiment of a foldable carrying equipment according to the present invention is provided. A carrying equipment 1a in this embodiment is about the same as the carrying equipment 1 of the above embodiment and the difference between the carrying equipment 1a and the carrying equipment 1 is in that a bar 34 is connected between the upmost pivot piece 310 of the support rod 31 and the corresponding pivot plate 23 and mounted in the gap 220 for supporting the objects loaded on the platform 20. An anti-pinch plate 35 is connected and fixed on the bar 34 for completely covering the bar 34 and the gap 220 with the bar 34 therein. Thereby the above design effectively protects users fingers from injuries caused by being trapped in the gap 220 during extension and folding processes.

In a preferred embodiment, the bar 34 is connected between the respective pivot pieces 310 and the corresponding pivot plates 23. Although the anti-pinch plate 35 is only disposed on the upmost bar 34 in the figures, the position of the anti-pinch plate 35 is not limited. The anti-pinch plate 35 can also be disposed on another bar 34.

Figure 15:
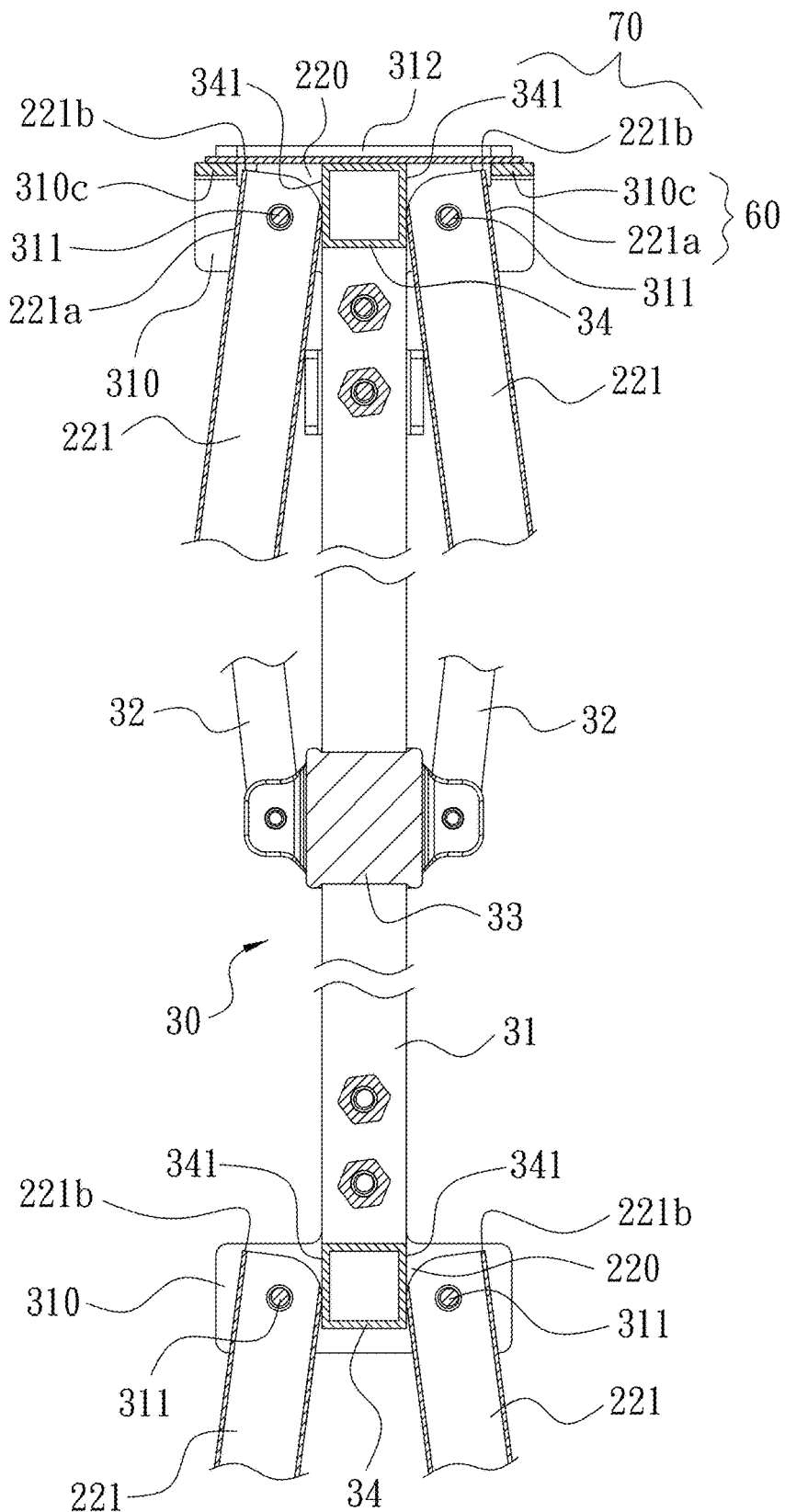
FIG. 15 is a partial side sectional view showing a support linkage rod set, a bar, and a side frame assembled with one another of a second embodiment in a folded state according to the present invention.
Figure 16:
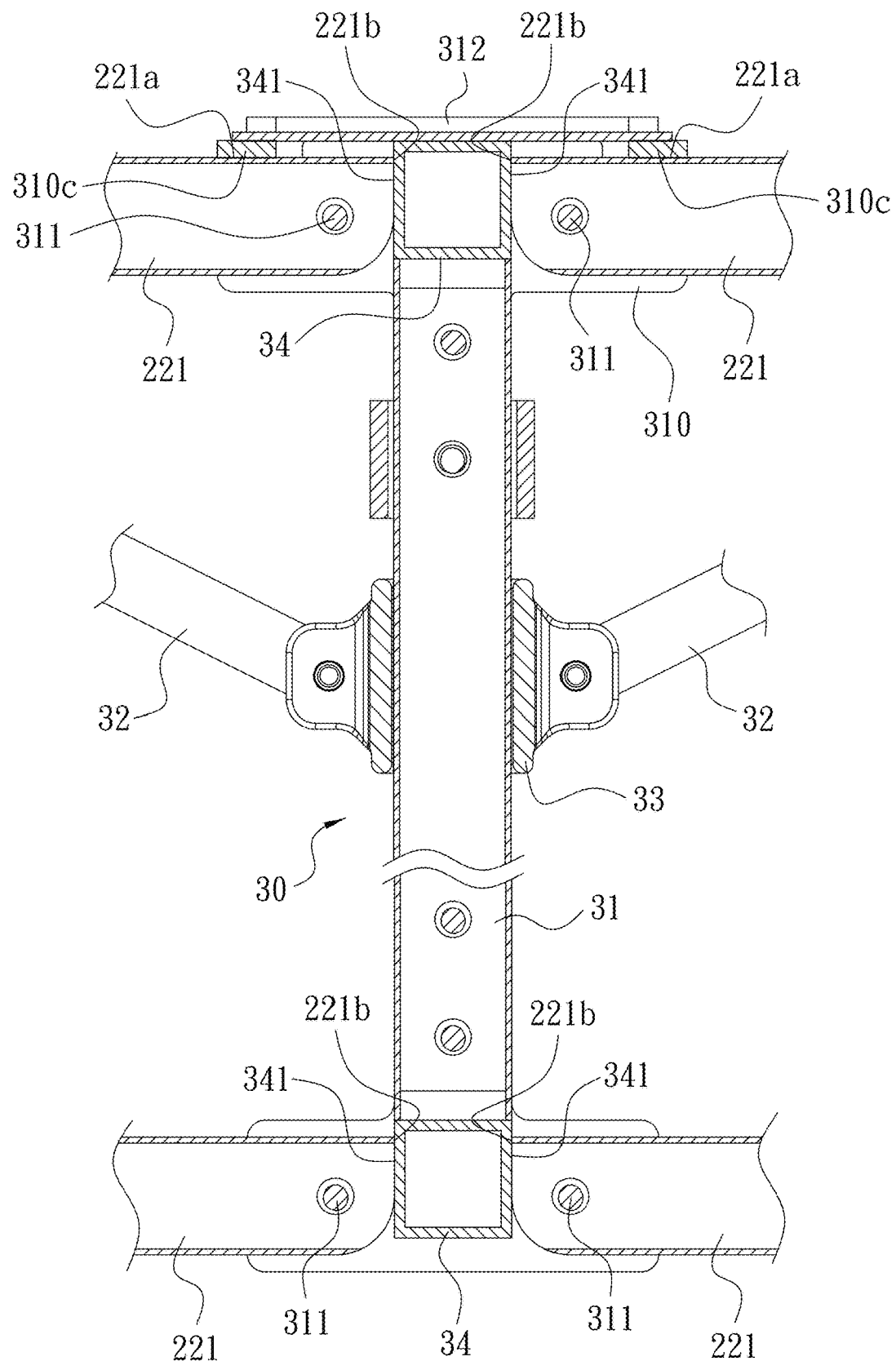
FIG. 16 is a partial side sectional view showing a support linkage rod set, a bar, and a side frame assembled with one another of a second embodiment in an extended state according to the present invention.

As shown in FIG. 15 and FIG. 16, the carrying equipment 1a in this embodiment further includes a second inner stopper 60 which is composed of a plurality of limit stopping portions 310c and a plurality of leaning walls 221a, respectively formed by two upper sides above the second pivot point 311 of the pivot piece 310 projecting inward horizontally and a top wall surface of the side frame 221 at the extended position. When the respective loading plates 20a of the platform 20 are pivotally rotated from the folded position to the extended position, abutting-against and limiting effect is created by the leaning walls 221a of the side frame 221 abutting against and stopped by the corresponding limit stopping portions 310c. Thereby the support for the inner sides 22 of the respective loading plates 20a of the platform 20 are further reinforced.

As shown in FIG. 15, the carrying equipment 1a in this embodiment further includes a third inner stopper 70 which consists of a plurality of side stopping walls 341 and a plurality of leaning edges 221b, respectively formed on two sides of the bar 34 and the side frame 221 of the loading plate 20a corresponding to the side stopping wall 341. When the respective loading plates 20a are pivotally rotated from the folded position to the extended position, stopping and limiting effect is created by the leaning edges 221b leaning against the corresponding side stopping walls 341 of the bar 34. Thereby the support for the inner sides 22 of the respective loading plates 20a of the platform 20 are further increased.

It should be noted that at least one of the second inner stopper 60 and the third inner stopper 70 in this embodiment can be used to replace the first inner stopper 50 in the first embodiment mentioned above. That doesn't mean at least one of the second inner stopper 60 and the third inner stopper 70 or both are unable to integrate with the first inner stopper 50 or coexist with the first inner stopper 50. By modifications made to the structural design, the first inner stopper 50, the second inner stopper 60, and the third inner stopper 70 can selectively or all exist in the same embodiment at the same time so as to adjust support strength levels of the respective loading plates 20a of the platform 20 according to specifications, properties, and uses of the products.

Figure 17:
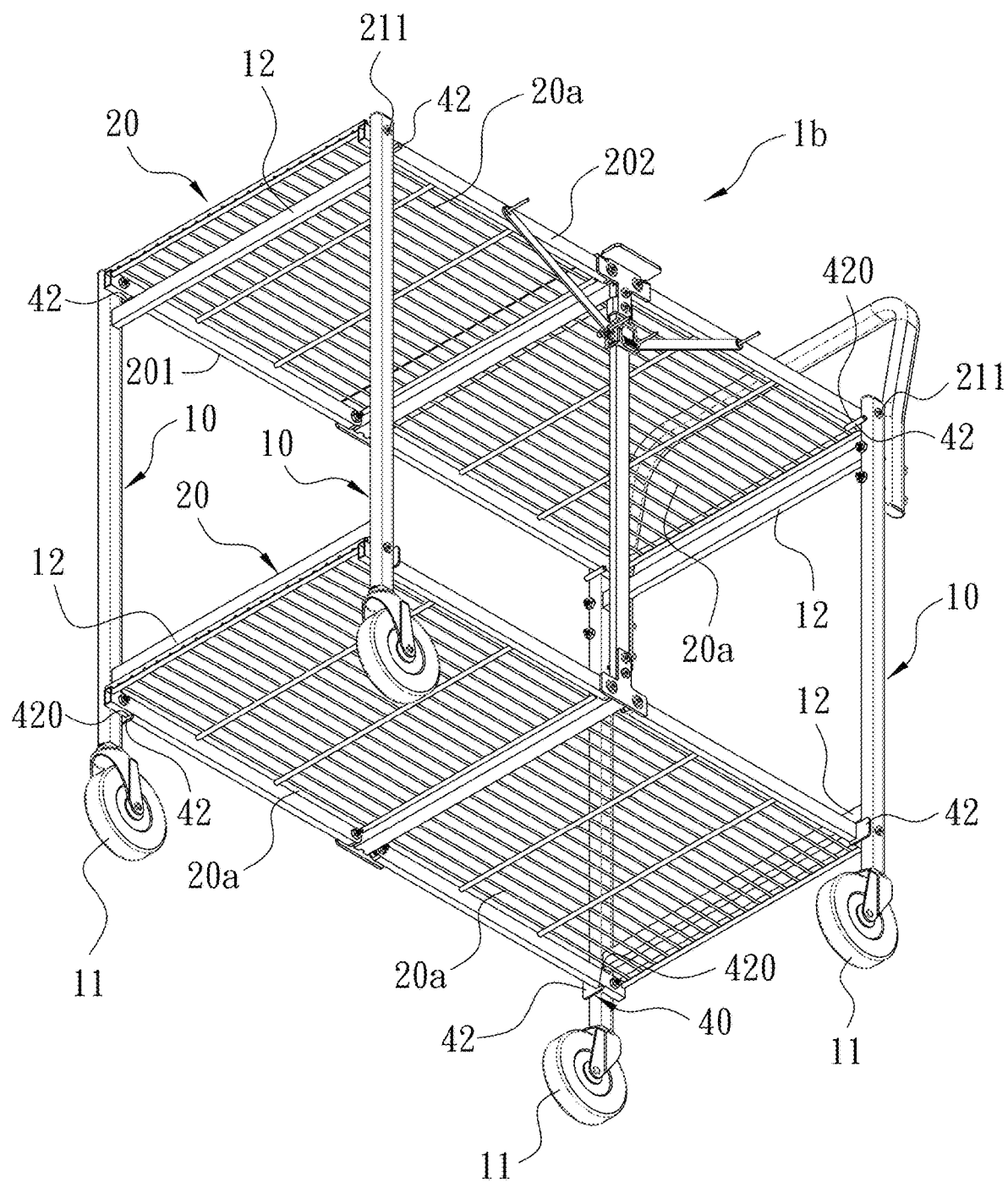
FIG. 17 is a bottom perspective view of a third embodiment in an extended state according to the present invention.
Figure 18:
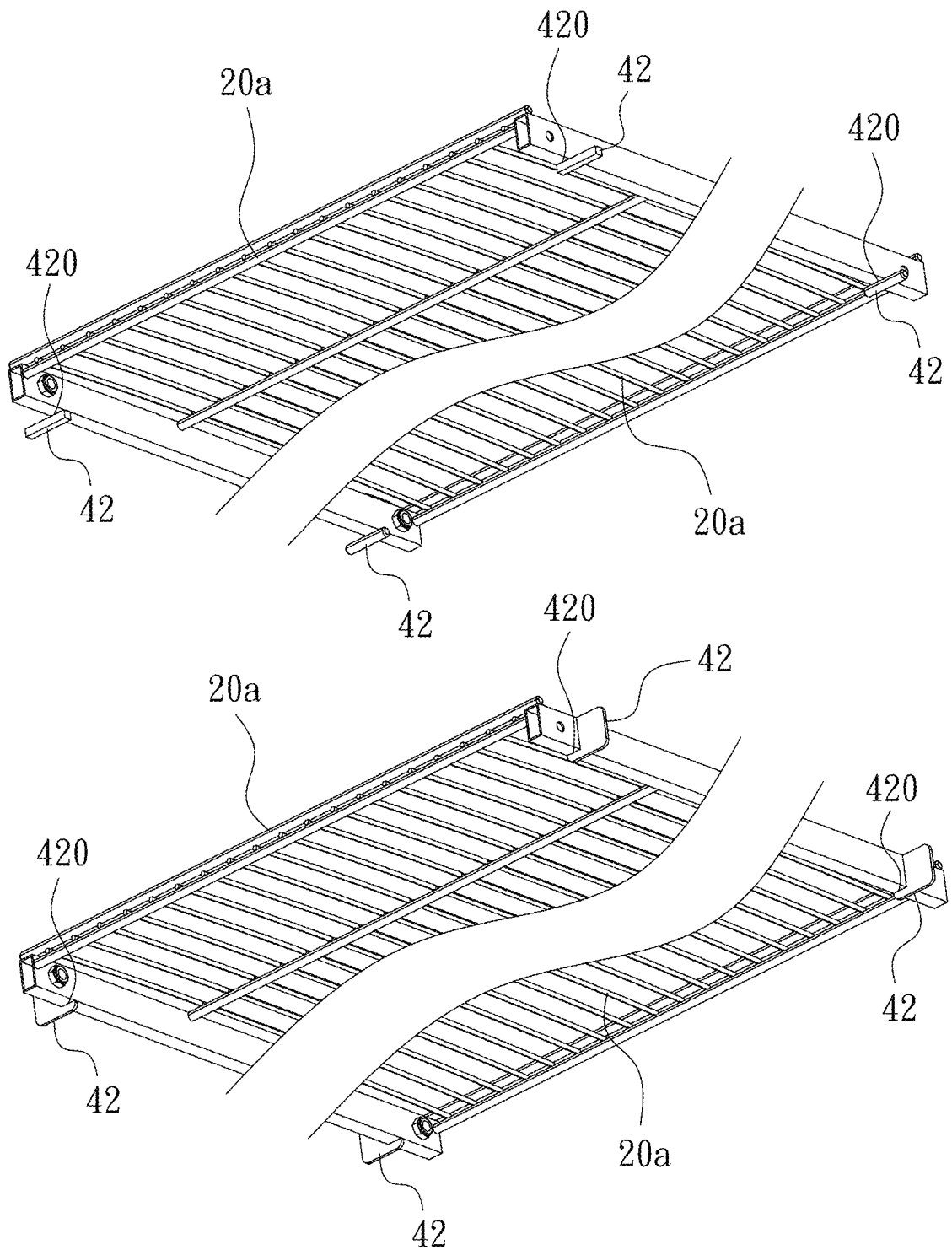
FIG. 18 is a partial perspective view showing a bottom of the embodiment in FIG. 17 according to the present invention.

Refer to FIG. 17 and FIG. 18, a third embodiment of a foldable carrying equipment according to the present invention is provided. A carrying equipment 1b in this embodiment is about the same as the carrying equipment 1 of the above embodiment and the difference between the carrying equipment 1b and the carrying equipment 1 is in that: the stopping member in this embodiment is a support member 42 which is connected and fixed on the inner side of the leg 10 and provided with a stopping area 420. When the respective loading plates 20a of the platform 20 are pivotally rotated to the extended position, the stopping area 420 is abutting against corresponding part of the respective loading plates 20a for supporting. In other words, the two end portions 411 of the horizontal support rod 41 are connected to the two legs 10 adjacent to each other at the same side so that the two stopping portions 410 are formed on the two horizontal support rods 41 correspondingly in the first embodiment. In this embodiment, each of the support member 42 is connected and fixed on the single leg 10 so that only one stopping area 420 is formed on the support member 42.

It should be understood that connection rods 12 are added to connect the two adjacent legs 10 at the same side in order to improve connection strength and structural stability since the support member 42 is not connected with the two adjacent legs 10 at the same side.

Furthermore, a rotating wheel 11 is mounted to a bottom of the respective legs 10 of the carrying equipment 1b so that users can push and move the carrying equipment 1b conveniently. The carrying equipment 1b is in the form of a trolley.

Figure 19:
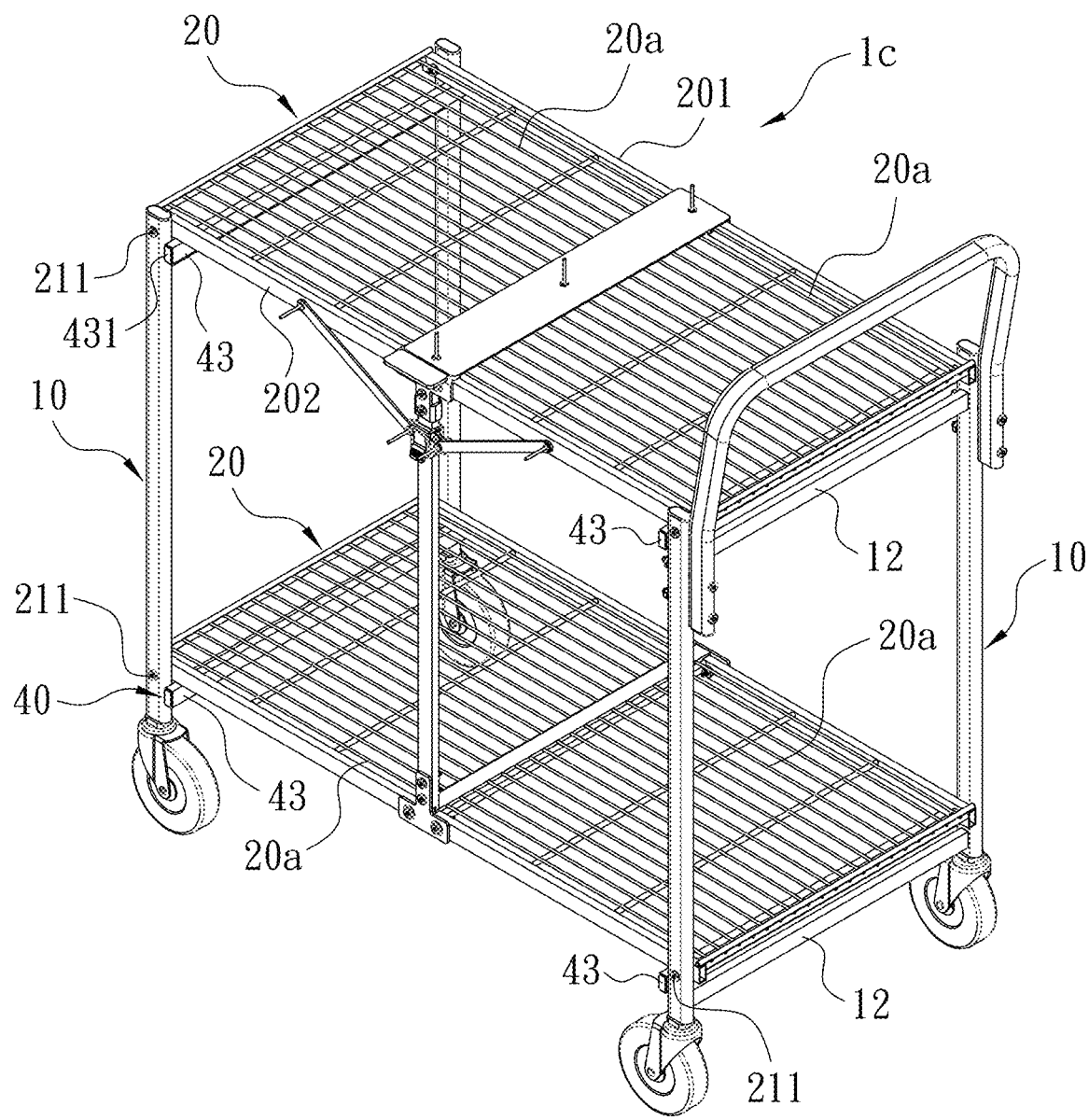
FIG. 19 is a perspective view of a fourth embodiment in an extended state according to the present invention.
Figure 20:
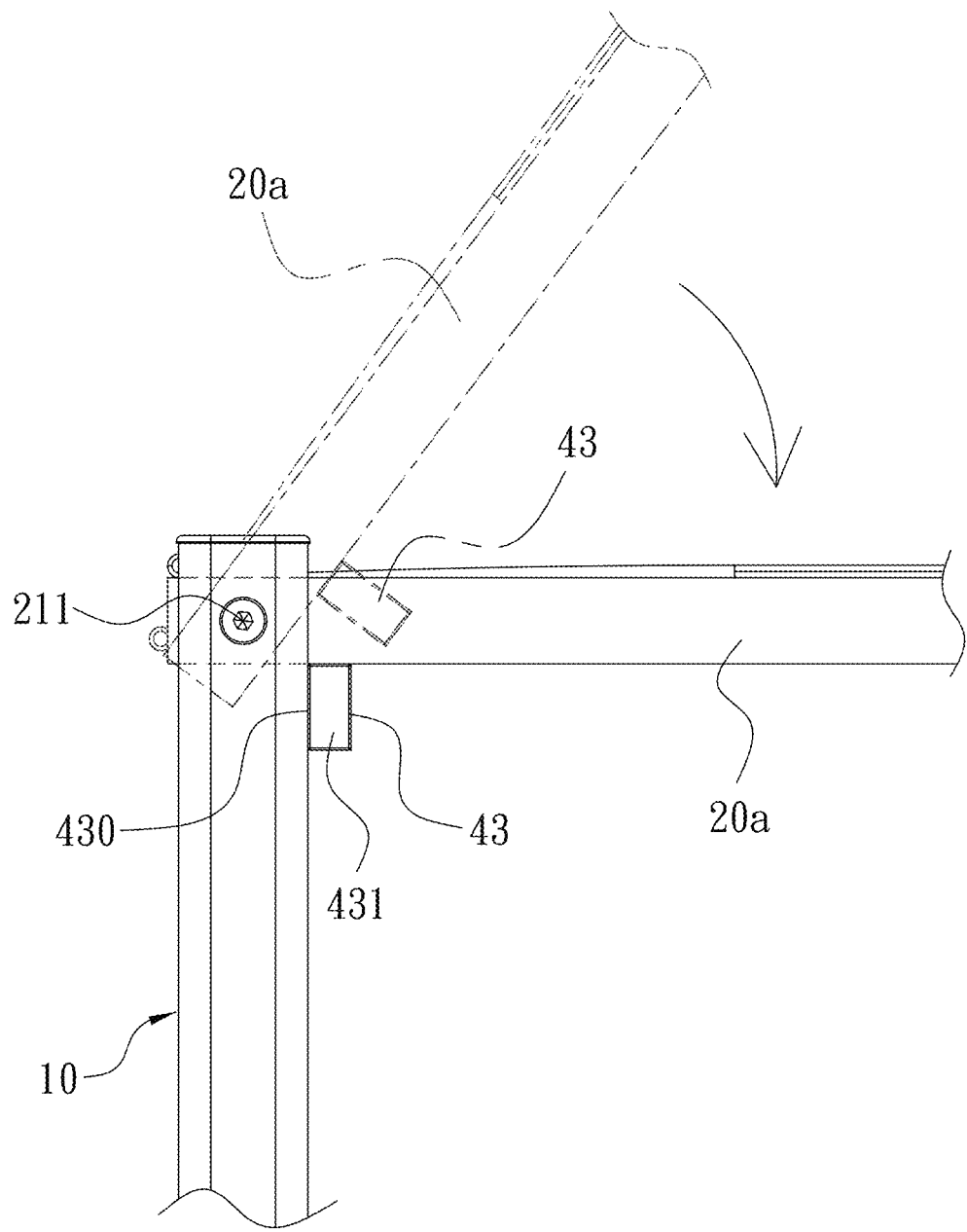
FIG. 20 is a schematic drawing showing a loading plate pivotally rotated from a folded position to an extended position of the embodiment in FIG. 19 according to the present invention.

Refer to FIG. 19 and FIG. 20, a fourth embodiment of a foldable carrying equipment according to the present invention is provided. A carrying equipment 1c in this embodiment is about the same as the carrying equipment 1 of the above embodiment and the difference between the carrying equipment 1c and the carrying equipment 1 is in that: the stopping member in this embodiment is an abutting horizontal rod 43 with two end portions 431 connected and fixed on an area close to the outer side 21 of the loading plates 20a of the platform 20 to form a stopping part 430 on each of the end portions 431. The stopping part 430 is located on the inner side of the outer pivot point 211. When the respective loading plates 20a of the platform 20 are pivotally rotated to the extended position at the same time, the stopping part 430 is abutting against corresponding area of the respective legs 10. By the abutting horizontal rod 43 at the extended position and the legs 10 abutting against each other, the support strength of the outer side 21 of the respective loading plates 20a of the platform 20 is improved.

Similarly, the stopping member in this embodiment can also be an abutting member which works like the support member 42 in the third embodiment mentioned above. The difference is only in that the abutting member is connected and fixed on the respective loading plates 20a, instead of the legs 10. Each of the abutting members is provided with one of the stopping parts 430 which is abutting against a corresponding area of the respective legs 10 when the respective loading plates 20a of the platform 20 are pivotally rotated to the extended position at the same time.

Figure 21:
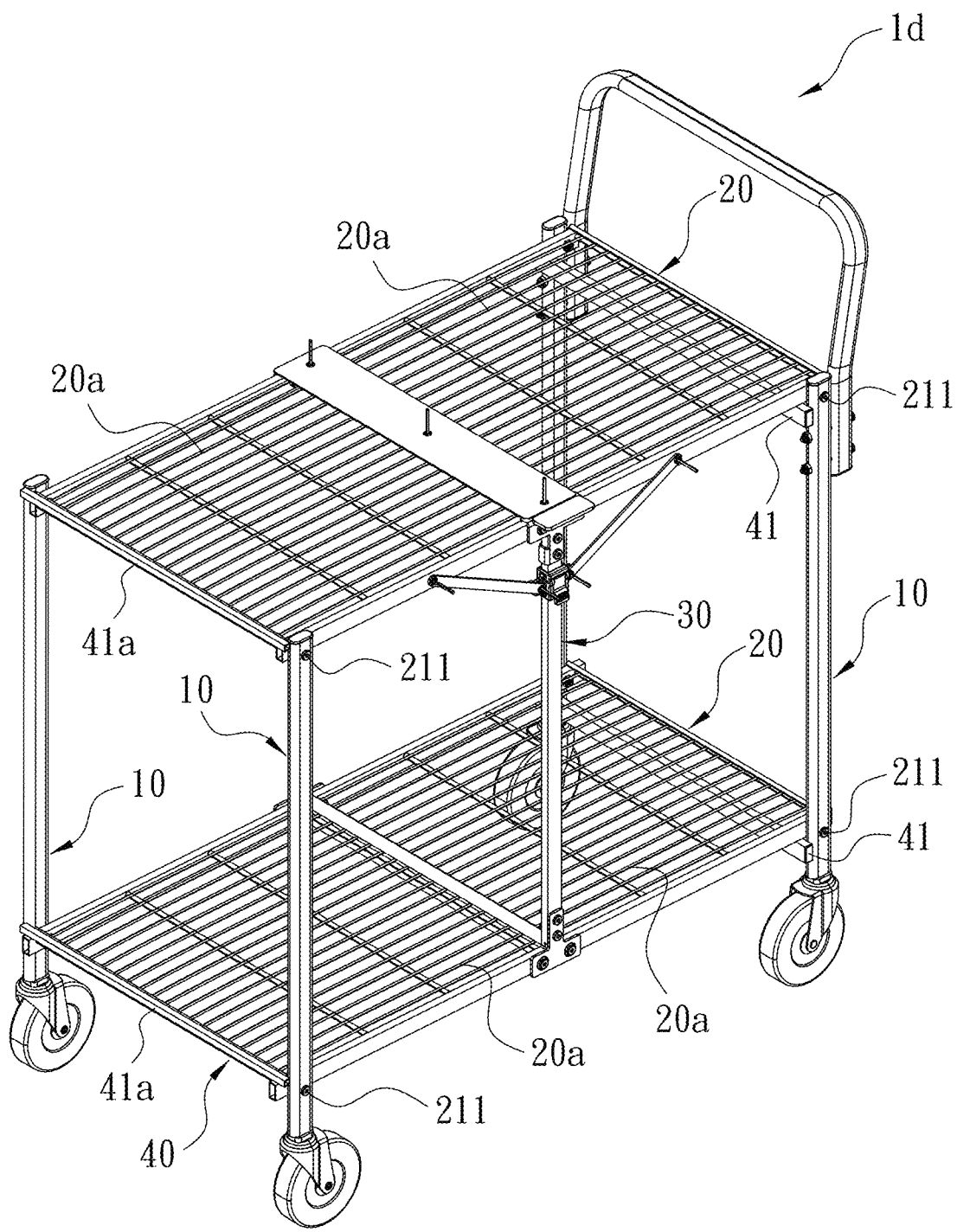
FIG. 21 is a perspective view of a fifth embodiment according to the present invention.
Figure 22:
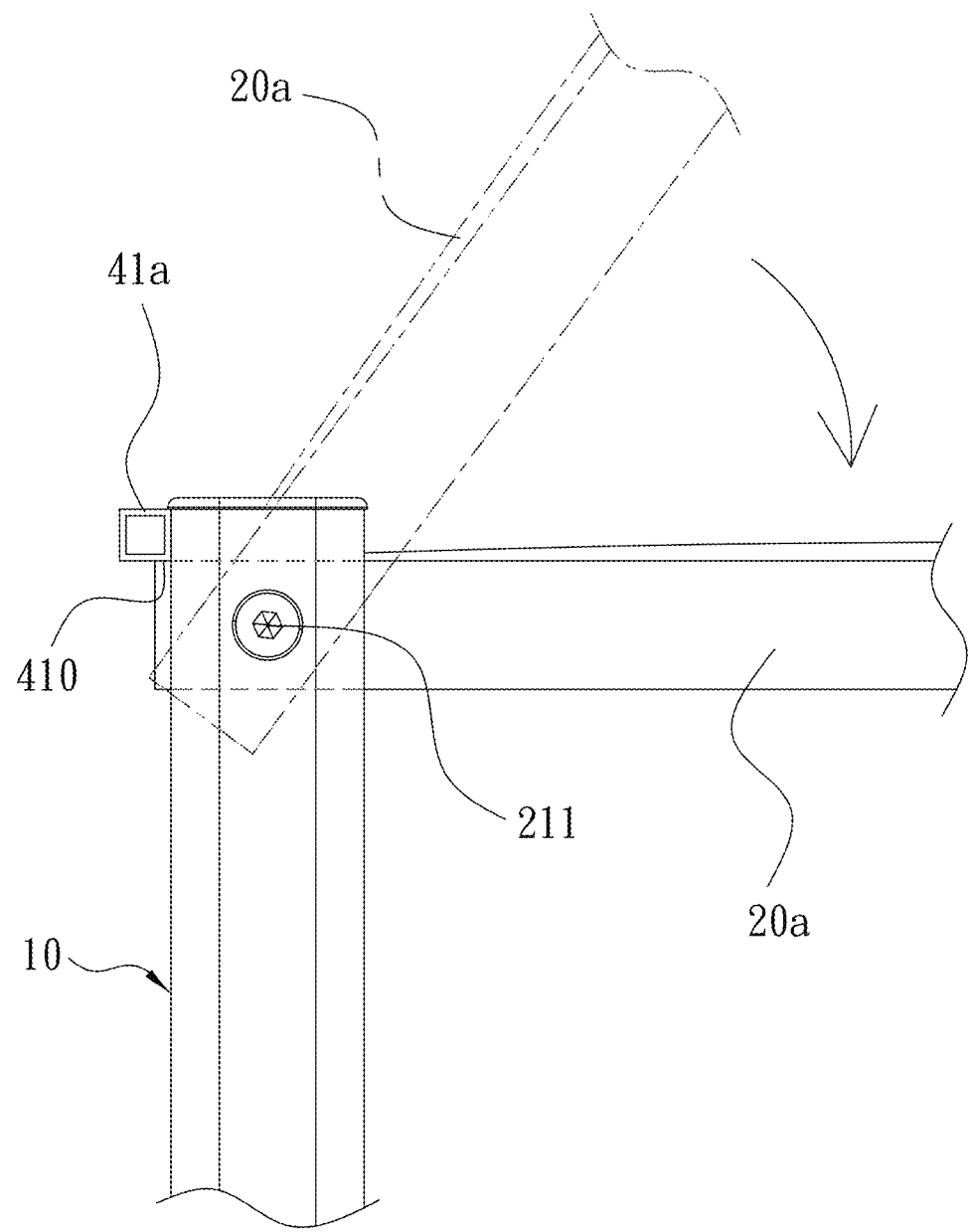
FIG. 22 is a schematic drawing showing a loading plate pivotally rotated from a folded position to an extended position of the embodiment in FIG. 21 according to the present invention.

As shown in FIG. 21 and FIG. 22, a fifth embodiment of a foldable carrying equipment according to the present invention is provided. A carrying equipment 1d in this embodiment is about the same as the carrying equipment 1 of the above embodiment and the difference between the carrying equipment 1d and the carrying equipment 1 is in that: the two end portions 411 of at least a part of the horizontal support rods 41a are selectively connected and fixed on an outer side of the two adjacent legs 10 located at the same side so that the stopping portion 410 on the end portion 411 is located on the outer side of the outer pivot point 211. When the loading plate 20a is pivotally rotated from the folded position to the extended position at the same time, an area of the outer side 21 of the loading plate 20a such as a top surface in the figure is moved upward to abut against the corresponding stopping portion 410 under the end portion 411 of the horizontal support rod 41a. Thereby the support strength of the outer side 21 of the respective loading plates 20a of the platform 20 is reinforced.

The above horizontal support rods 41a can also be designed to be similar to the support member 42 of the third embodiment mentioned above. That means one of the horizontal support rods 41a is replaced by the two support members 42 and the same abutting-against and limiting effect are achieved.

According to the above embodiments, it is learned that in the present carrying equipment 1~1d, the outer side 21 and the inner side 22 of the loading plate 20a are abutting against and supported well by the legs 10 or the outer stoppers 40 arranged at the outer sides 21 of the loading plates 20a in combination with the first inner stopper 50 disposed on the inner sides 22 of the loading plates 20a, and/or the second inner stopper 60, and/or the third inner stopper 70 when the platform 20 is pivotally rotated from the folded position to the extended position. Thereby it is ensured that the loading plates 20a are maintained at the horizontal state, without collapse or deformation, especially while being loaded with heavy objects.

In summary, the outer stopper 40 used in combination with the first inner stopper 50, and/or the second inner stopper 60, and/or the third inner stopper 70 can ensure sufficient support or loading strength of the outer side 21 and the inner side 22 of the respective loading plates 20a of the platform 20 while the design of the single support linkage rod set 30 is used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A kind of foldable carrying equipment comprising:
   four legs;
   at least two platforms disposed vertically and each of the platform having two loading plates adjacent to each other and a plurality of pivot plates; each of the loading plates including a first side, a second side opposite to the first side, an inner side, and an outer side; the two outer sides of the two adjacent loading plates away from each other and the two inner sides of the two adjacent loading plates close to each other; two ends of the outer side of the loading plate pivotally connected to the legs to form outer pivot points correspondingly; a junction between the inner side and the first side of the loading plate pivotally connected to the pivot plate to form a first pivot point and a gap formed between the two inner sides of the loading plates; thus the inner side of the loading plate able to be either moved upward and pivotally rotated to a folded position, or moved downward and pivotally rotated to an extended position;
   a support linkage rod set disposed on the second side of the loading plate and having a support rod, two linkage rods, and a slider; the support rod vertically arranged and pivotally connected to the inner sides of the loading plates of the platform; the two linkage rods disposed in a V-shape and each of the linkage rods provided with a first end portion and a second end portion; the first end portion pivotally connected to a position between the outer side and the inner side of the loading plate of the platform; the slider slidably moved along the support rod and operable to be loosened from or fastened on the support rod; the second end portion of the linkage rod pivotally connected to and positioned on the slider; the slider being forced to slide along the support rod and further drive the loading plates of the platform to be pivotally rotated and switched between the folded position and the extended position when a force applied to a top end of the support rod for vertical operation;

wherein the support rod is provided with at least two pivot pieces each of which having two second pivot points; the pivot piece is disposed on a position at the same level as the corresponding platform; a junction between the inner side and the second side of the loading plate is pivotally connected to the pivot piece to form the second pivot point; the two second pivot points are spaced apart due to the gap between the two inner sides of the loading plates; thereby the junction between the inner side and the first side of the loading plate, and the junction between the inner side and the second side of the loading plate are respectively able to be pivotally rotated around the first pivot point and the second pivot point synchronously, and thus switched between the folded position and the extended position;

wherein an outer stopper having a plurality of stopping members arranged at the outer sides of the loading plates of the platform away from each other or the corresponding legs; the adjacent loading plates are stopped and limited by the stopping members, without being rotated to a valley-folding direction when the loading plate is pivotally rotated downward to the extended position; wherein a first inner stopper having a plurality of first limit bumps, a plurality of second limit bumps, and a plurality of limit blocks; the first limit bump is projecting from an area around the first pivot point on an inner side of the pivot plate and each of the first limit bumps is provided with a first limit wall formed on each of two sides of the first limit bump; the second limit bump is projecting from an area around the second pivot point on an inner side of the pivot piece and each of the second limit bumps is provided with a second limit wall formed on each of two sides of the second limit bump; the limit blocks are disposed on the first pivot point and the second pivot point of the loading plate; each of the limit blocks is provided with a limit lock wall; when the loading plate is pivotally rotated from the folded position to the extended position, the limit lock walls are abutting against and stopped by the first limit wall of the pivot plate and the second limit wall of the pivot piece correspondingly.

2. The foldable carrying equipment as claimed in claim 1, wherein the stopping member is a horizontal support rod having two end portions fixed on at least one of an inner side and an outer side of the two legs adjacent to each other and located at the same side; the end portion of the horizontal support rod is provided with a stopping portion; the first side and the second side of the loading plate are both provided with a side frame which is able to be abutting against and stopped by the stopping portion when the loading plate is pivotally rotated to the extended position.

3. The foldable carrying equipment as claimed in claim 1, wherein the stopping member is a support member which is connected and fixed on at least one of an inner side and an outer side of the leg and provided with a stopping area; the first side and the second side of the loading plate are both provided with a side frame which is able to be abutting against and stopped by the stopping area when the loading plate is pivotally rotated to the extended position.

4. The foldable carrying equipment as claimed in claim 1, wherein a lug is horizontally protruding from of the inner side of the pivot piece of the support rod at the same level of the upmost platform and located over the second pivot point; a stopping edge is arranged adjacent to the limit lock wall of the limit block corresponding to the lug; the stopping edge is abutting against and limited by the lug of the corresponding pivot piece when the loading plate is pivotally rotated from the folded position to the extended position; the lug of the pivot piece and the limit lock wall of the corresponding limit block are combined to form a part of the first inner stopper.

5. The foldable carrying equipment as claimed in claim 4, wherein a braking plate to which users can apply forces vertically is disposed on the top end of the support rod and the lug is integrally extended from an inner side of the braking plate.

6. The foldable carrying equipment as claimed in claim 1, wherein a lug is horizontally protruding from of the inner side of the pivot plate of the upmost platform and located above the first pivot point; a stopping edge is arranged adjacent to the limit lock wall of the limit block corresponding to the lug; the stopping edge of the limit block is abutting against and limited by the lug of the corresponding pivot plate when the loading plate is pivotally rotated from the folded position to the extended position; the lug and the limit lock wall of the corresponding limit block are combined with to form a part of the first inner stopper.

7. The foldable carrying equipment as claimed in claim 6, wherein a detent plate is arranged at a top end of the pivot plate of the upmost platform and the lug is integrally extended from an inner side of the detent plate.

8. The foldable carrying equipment as claimed in claim 1, wherein a bar is connected between at least the upmost pivot piece of the support rod and the corresponding pivot plate and able to be mounted in the gap; an anti-pinch plate is connected and fixed on the bar for completely covering the bar and the gap with the bar therein.

9. The foldable carrying equipment as claimed in claim 1, wherein a bar is connected between at least one of the pivot pieces of the support rod and the corresponding pivot plate and mounted in the gap; a limit stopping portion is formed by two upper sides above the second pivot point of the pivot piece on the top end of the support rod projecting inward horizontally; the first side and the second side of the loading plate are both provided with a side frame and a leaning wall is disposed on the side frame and corresponding to the limit stopping portion; the leaning wall is abutting against the limit stopping portion when the loading plate is pivotally rotated from the folded position to the extended position; the limit stopping portion and the leaning wall are combined to form a second inner stopper.

10. The foldable carrying equipment as claimed in claim 1, wherein a bar is connected between at least one of the pivot pieces of the support rod and the corresponding pivot plate and mounted in the gap; a side stopping wall is formed on each of two sides of the bar; the first side and the second side of the loading plate are both provided with a side frame; a leaning edge is arranged at the side frame and corresponding to the side stopping wall; when the loading plate is pivotally rotated from the folded position to the extended position, the leaning edges are leaning against the corresponding side stopping walls of the bar; the side stopping walls and the leaning edges are combined to form a third inner stopper.

* * * * *